(12) United States Patent
Park et al.

(10) Patent No.: US 12,429,664 B2
(45) Date of Patent: Sep. 30, 2025

(54) CAMERA MODULE

(71) Applicant: LG INNOTEK CO., LTD., Seoul (KR)

(72) Inventors: Jung Bae Park, Seoul (KR); Ui Jun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 614 days.

(21) Appl. No.: 17/757,284

(22) PCT Filed: Dec. 10, 2020

(86) PCT No.: PCT/KR2020/018070
§ 371 (c)(1),
(2) Date: Jun. 13, 2022

(87) PCT Pub. No.: WO2021/118264
PCT Pub. Date: Jun. 17, 2021

(65) Prior Publication Data
US 2023/0003965 A1    Jan. 5, 2023

(30) Foreign Application Priority Data

Dec. 11, 2019  (KR) .......................... 10-2019-0164871

(51) Int. Cl.
*H04N 23/54* (2023.01)
*G02B 3/14* (2006.01)
(Continued)

(52) U.S. Cl.
CPC .............. *G02B 7/028* (2013.01); *G02B 3/14* (2013.01); *G02B 7/08* (2013.01); *H04N 23/54* (2023.01); *H04N 23/55* (2023.01)

(58) Field of Classification Search
CPC . G02B 7/08; G02B 7/028; G02B 3/14; H04N 23/54; H04N 23/55
(Continued)

(56) References Cited

U.S. PATENT DOCUMENTS

2008/0259463 A1* 10/2008 Shepherd ................. G02B 3/14
359/666
2010/0276491 A1* 11/2010 Havens ..................... G02B 3/12
359/665
(Continued)

FOREIGN PATENT DOCUMENTS

DE        20180087082      *  3/1988
JP        2011-259314 A     12/2011
(Continued)

OTHER PUBLICATIONS

International Search Report dated Mar. 11, 2021 in International Application No. PCT/KR2020/018070.

*Primary Examiner* — Pinping Sun
*Assistant Examiner* — Andrew R Wright
(74) *Attorney, Agent, or Firm* — Saliwanchik, Lloyd & Eisenschenk

(57) ABSTRACT

An embodiment is a camera module comprising: a lens assembly comprising a liquid lens which comprises a first liquid and a second liquid forming an interface with each other; a temperature sensor for sensing the temperature information of the liquid lens; a controller for adjusting the interface by applying a driving signal to the liquid lens; and a compensation unit for outputting, to the controller, feedback information in which the inclination of the diopter of the liquid lens with respect to the driving signal is proportional to the temperature in a first area and the inclination of the diopter of the liquid lens with respect to the driving signal is inversely proportional to the temperature in a second area which differs from the first area.

15 Claims, 23 Drawing Sheets

(51) Int. Cl.
  *G02B 7/02* (2021.01)
  *G02B 7/08* (2021.01)
  *H04N 23/55* (2023.01)

(58) Field of Classification Search
  USPC .......................................................... 359/820
  See application file for complete search history.

(56) References Cited

U.S. PATENT DOCUMENTS

| | | | |
|---|---|---|---|
| 2018/0180774 A1* | 6/2018 | Nagahama | G02B 7/28 |
| 2019/0129135 A1* | 5/2019 | Sugita | G02B 7/021 |
| 2021/0141187 A1* | 5/2021 | Park | G02B 26/005 |
| 2021/0208388 A1* | 7/2021 | Moon | G02B 26/005 |

FOREIGN PATENT DOCUMENTS

| | | | |
|---|---|---|---|
| JP | 2018-106126 A | | 7/2018 |
| KR | 10-2018-0087082 A | | 8/2018 |
| KR | 3712145 A1 | * | 8/2018 |
| KR | 10-2019-0089491 A | | 7/2019 |
| WO | 2019/099430 A1 | | 5/2019 |

\* cited by examiner

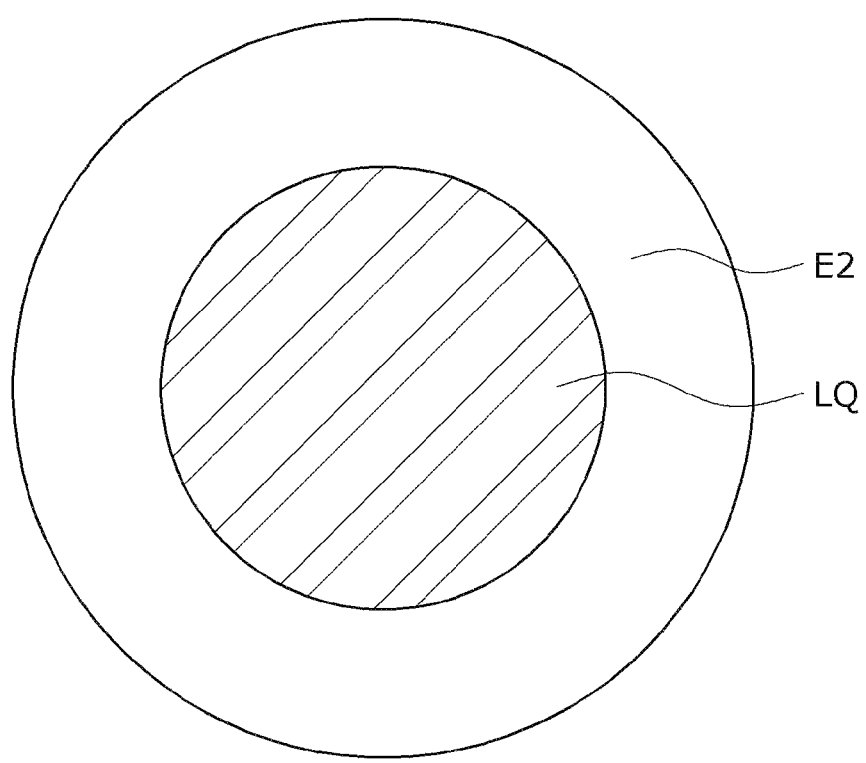

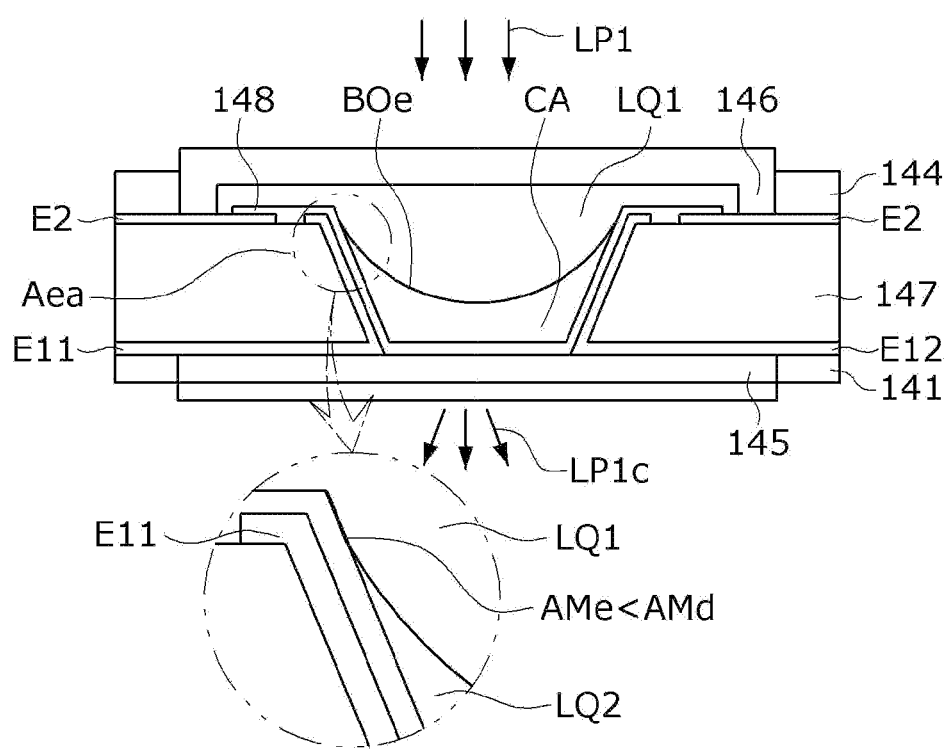

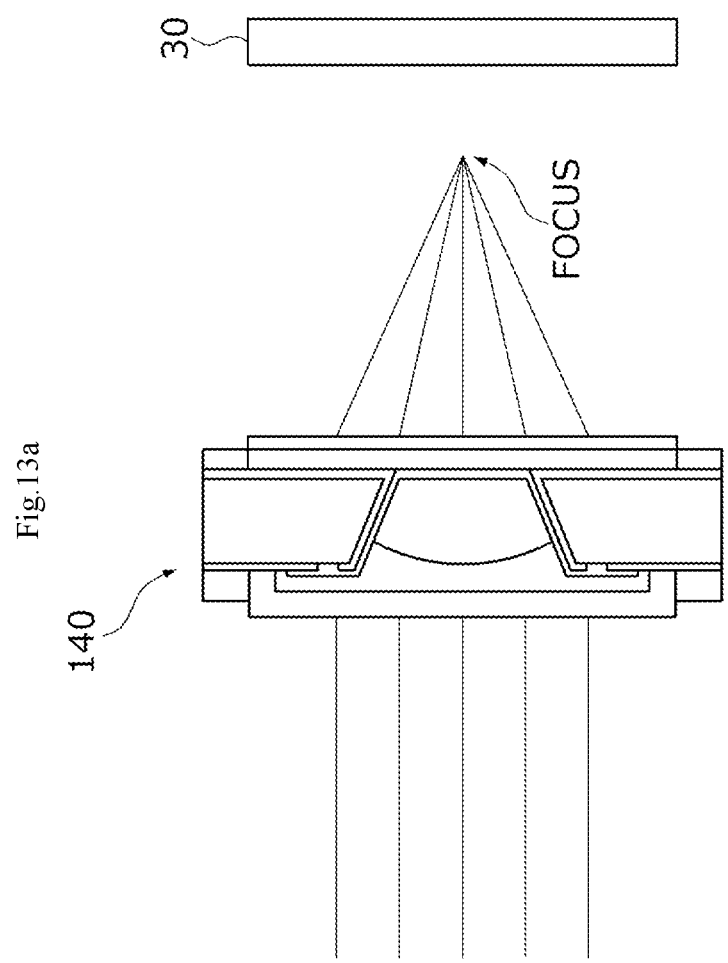

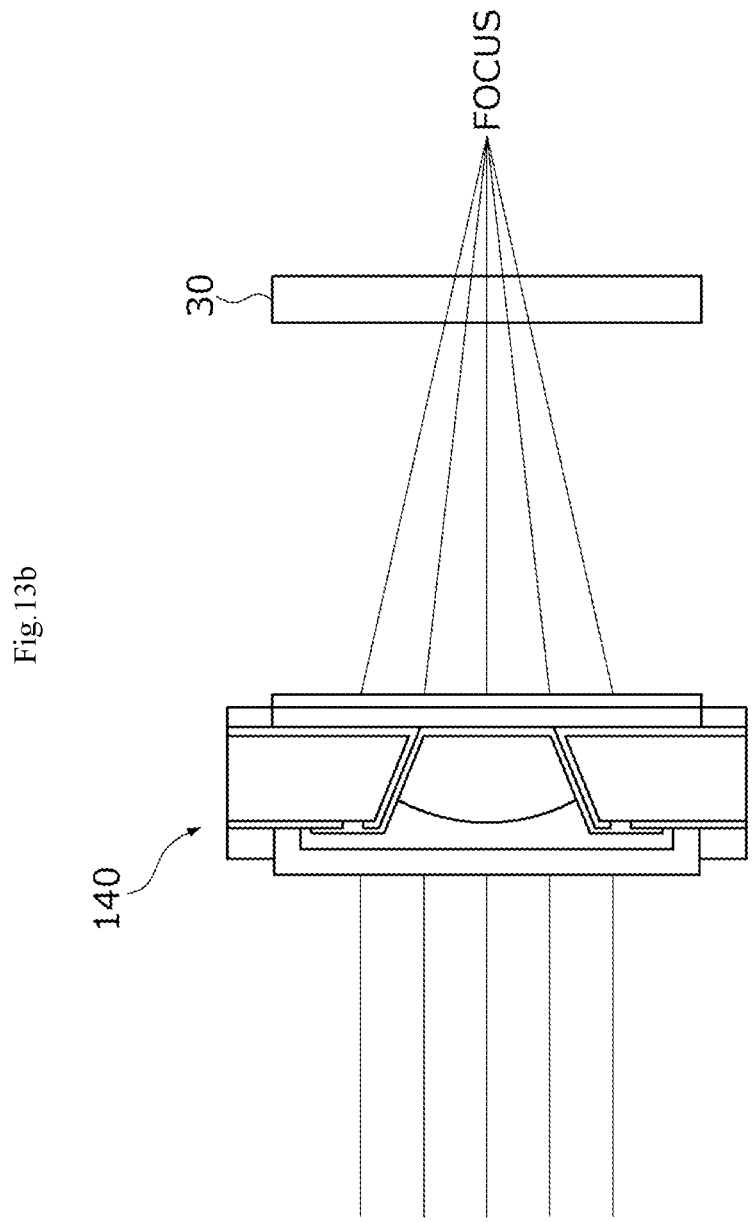

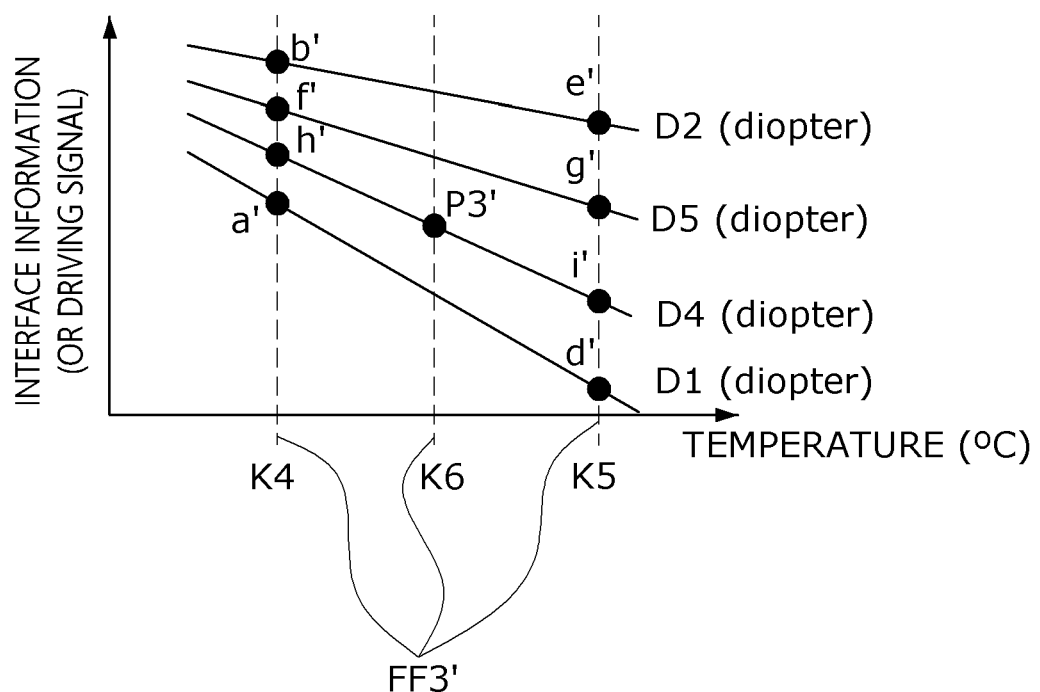

CAMERA MODULE

CROSS-REFERENCE TO RELATED APPLICATIONS

This application is the U.S. national stage application of International Patent Application No. PCT/KR2020/018070, filed Dec. 10, 2020, which claims the benefit under 35 U.S.C. § 119 of Korean Application No. 10-2019-0164871, filed Dec. 11, 2019, the disclosures of each of which are incorporated herein by reference in their entirety.

TECHNICAL FIELD

An embodiment relates to a camera module.

BACKGROUND ART

Users of portable devices demand optical devices that have high resolution, are small in size, and have various photographing functions. For example, the various photographing functions may include at least one of an optical zoom-in/zoom-out function, an auto-focusing (AF) function, and a hand-shake compensation or optical image stabilizer (OIS) function.

Conventionally, in order to realize the above-described various photographing functions, a method of combining a plurality of lenses and directly moving the combined lenses is used. However, in the case in which the number of lenses is increased as described above, the size of the optical device may be increased.

The auto-focusing function and the hand-shake compensation function are performed by moving or tilting several lenses, which are fixed to a lens holder and are aligned with an optical axis, along the optical axis or in a direction perpendicular to the optical axis, and to this end, a separate lens-driving device is required to drive a lens assembly composed of a plurality of lenses. However, the lens-driving device exhibits high power consumption, and the overall size of the conventional camera module is increased because a cover glass needs to be separately added to the camera module in order to protect the lens-driving device. In order to solve this, research has been conducted on a liquid lens unit, which performs the auto-focusing function and the hand-shake compensation function by electrically adjusting a curvature of an interface of two types of liquids.

However, in the liquid lens, a focal length or diopter is deformed according to the temperature, and thus it is necessary to improve the accuracy.

DISCLOSURE

Technical Problem

An embodiment is directed to providing a camera module that includes a lens capable of adjusting a position of an interface positioned between two liquids according to electrical energy and is capable of compensating for a change in a focal length or a diopter caused by deformation occurring according to the temperature of the lens that has a structure in which the two liquids lens can be housed.

An embodiment is also directed to providing a camera module capable of adjusting a driving voltage that can adjust the movement of an interface, which is formed by two liquids, to correspond to a change in a spatial frequency response (SFR) according to a temperature change of a liquid lens in order to overcome the characteristics and tendency of the liquid lens, in which the degree of curvature and bias of the interface formed by the two liquids included in the lens are adjusted according to a supply voltage and the resolution of the lens is lowered due to deformation according to the temperature change.

Objectives to be solved by the embodiment are not limited to the above-described objective and will include objectives and effects which may be identified by solutions for the objectives and the embodiments described below.

Technical Solution

One aspect of the present invention provides a camera module including a lens assembly including a liquid lens having a first liquid and a second liquid that form an interface, a temperature sensor configured to detect temperature information of the liquid lens, a controller configured to adjust the interface by applying a driving signal to the liquid lens, and a compensation unit configured to output feedback information, in which an inclination of a diopter of the liquid lens according to the driving signal is proportional to a temperature in a first region and an inclination of the diopter of the liquid lens according to the driving signal is inversely proportional to the temperature in a second region that is different from the first region, to the controller.

A characteristic graph of the diopter of the liquid lens according to the driving signal may be divided into the first region and the second region on the basis of a point having an inflection point.

The camera module may further include a data unit configured to store a plurality of first driving signals for each temperature for a first diopter of the liquid lens in the first region, a plurality of second driving signals for each temperature for a second diopter of the liquid lens in the first region, a plurality of third driving signals for each temperature for the first diopter of the liquid lens in the second region, and a plurality of fourth driving signals for each temperature for the second diopter of the liquid lens in the second region, wherein the first diopter and the second diopter are different from each other.

The compensation unit may calculate a first-first driving function for the plurality of first driving signals, a second-first driving function for the plurality of second driving signals, a first-second driving function for the plurality of third driving signals, and a second-second driving function for the plurality of fourth driving signals.

In each of the first-first driving function and the second-first driving function, a curvature may be proportional to the temperature, but in each of the first-second driving function and the second-second driving function, the curvature may be inversely proportional to the temperature.

When the target diopter is greater than the inflection point, the compensation unit may calculate at least one of the first-first driving function and the second-first driving function as the feedback information.

The compensation unit may calculate a plurality of third-first driving functions for each temperature from the first-first driving function and the second-first driving function.

The compensation unit may calculate the feedback information using at least one of the first-first driving function, the second-first driving function, and the plurality of third-first driving functions.

The compensation unit may calculate at least one fourth-first driving function including a driving signal for the temperature for each diopter using the plurality of third-first driving functions.

The compensation unit may calculate the feedback information using the at least one fourth-first driving function.

When the target diopter is less than the inflection point, the compensation unit may calculate the feedback information corresponding to the temperature information and the target diopter using at least one of the first-second driving function and the second-second driving function.

The compensation unit may calculate a plurality of third-second driving functions for each temperature from the first-second driving function and the second-second driving function.

The compensation unit may calculate the feedback information using at least one of the first-second driving function, the first-second driving function, the second-second driving function, and the plurality of third-second driving functions.

The compensation unit may calculate at least one fourth-second driving function including a driving signal for the temperature for each diopter using the plurality of third-second driving functions.

Advantageous Effects

An embodiment can provide a camera module capable of inhibiting a decrease in resolution or in accuracy caused by a change in an interface of a liquid lens according to the temperature.

Various advantages and effects of the present invention are not limited to the above description and can be more easily understood through the description of specific exemplary embodiments of the present invention.

DESCRIPTION OF DRAWINGS

FIGS. 7A to 7C are views illustrating a structure of the liquid lens unit.

FIGS. 8A to 8E are views for describing a variation in a lens curvature of the liquid lens unit.

FIG. 13A is a view for describing a change in focus when the temperature increases in a first region.

FIG. 13B is a view for describing a change in focus when the temperature increases in a second region.

FIGS. 19 to 22 are diagrams for describing a relationship between the temperature, the diopter, and the driving signal in order to describe an operation of the controller according to the embodiment in the second region.

MODES OF THE INVENTION

Figure 1:
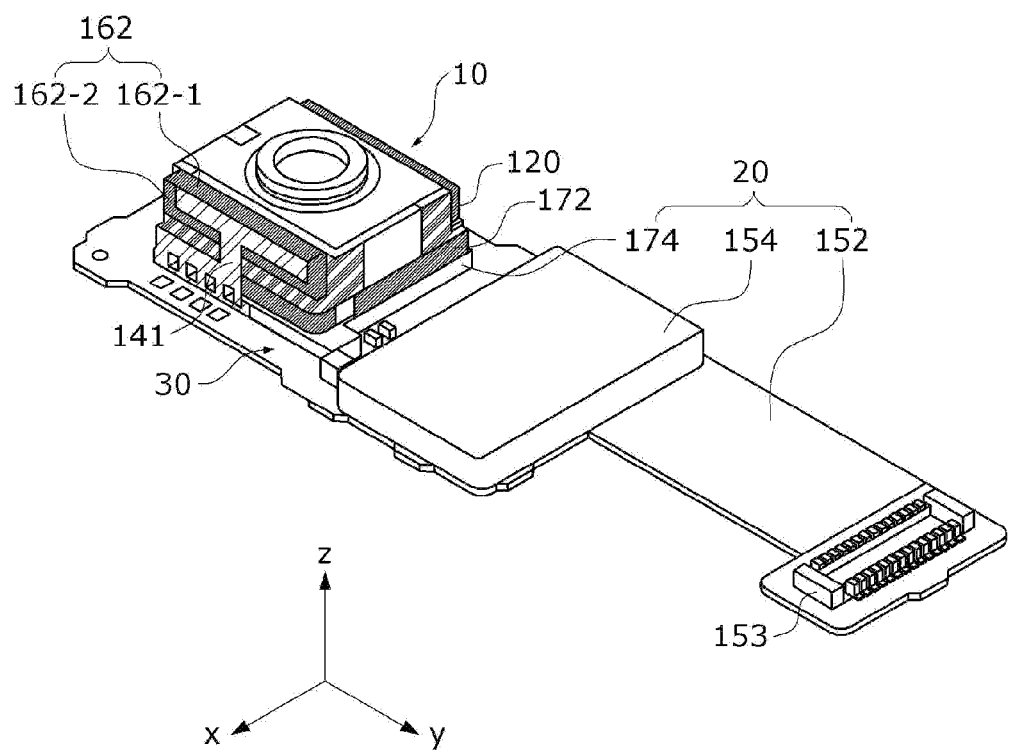
FIG. 1 is a schematic perspective view of a camera module according to an embodiment.

Hereinafter, exemplary embodiments of the present invention will be described in detail with reference to the accompanying drawings.

However, the technical spirit of the present invention is not limited to some embodiments to be disclosed below but may be realized in many different forms, and one or more components of each of the embodiments may be selectively combined and substituted within the scope of the present invention.

In addition, unless clearly and expressly defined herein, the terms (including technical and scientific terms) used in the embodiments of the present invention have the same meaning as commonly understood by one of ordinary skill in the art. It should be further understood that terms, such as those defined in commonly used dictionaries, should be interpreted as having a meaning that is consistent with their meaning in the context of the related art.

Further, the terms used in the embodiments of the present invention are provided only to describe embodiments of the present invention and not for purposes of limitation.

In the present specification, the singular forms include the plural forms unless the context clearly indicates otherwise, and the phrase "at least one element (or one or more elements) of an element A, an element B, and an element C" should be understood as including the meaning of at least one of all possible combinations of the element A, the element B, and the element C.

Further, in describing components of the embodiments of the present invention, the terms such as first, second, A, B, (a), (b), and the like may be used.

These terms are merely for distinguishing one component from another component, and the property, order, sequence, and the like of the corresponding components are not limited by the terms.

In addition, it will be understood that when one component is referred to as being "connected" or "coupled" to another component, the component may not only be directly connected or coupled to another component but may also be connected or coupled to another component with still another component presented between one component and another component.

Further, when one component is referred to as being formed or disposed "on (above)" or "under (below)" another component, the terms "on (above)" or "under (below)" includes both of a case in which the two components are in direct contact with each other or a case in which one or more components are (indirectly) formed or disposed between the two components. In addition, the term "on (above)" or "under (below)" includes a case in which another component is disposed in an upward direction or a downward direction with respect to one component.

The term "auto-focusing function" used below is defined as a function of automatically focusing on an object by moving a lens in an optical-axis direction to adjust a distance to an image sensor according to a distance to the object, in order to allow the image sensor to acquire a clear image of the object. Meanwhile, the "auto-focusing" may correspond to "auto focus (AF)."

The term "hand-shake compensation function" used below is defined as a function of moving a lens and/or an image sensor to offset vibrations (movement) generated in the image sensor by an external force. Meanwhile, the "hand-shake compensation" may correspond to "optical image stabilization (OIS)."

FIG. 1 is a schematic perspective view of a camera module according to an embodiment.

Referring to FIG. 1, a camera module 100 may include a lens assembly 10, a control circuit 20, and an image sensor 30.

First, the lens assembly 10 may include a plurality of lens units and a holder in which the plurality of lens units are accommodated. As will be described below, the plurality of lens units may include a liquid lens and may further include a first lens unit or a second lens unit. The plurality of lens units may include the first and second lens units and a liquid lens unit.

The control circuit 20 serves to supply a driving voltage (or an operating voltage) to the liquid lens unit.

The control circuit 20 and the image sensor 30, which are described above, may be disposed on a single printed circuit board (PCB), but this is merely given by way of example, and the embodiment is not limited thereto.

When the camera module 100 according to the embodiment is applied to an optical device or optical instrument, the configuration of the control circuit 20 may be designed in different ways according to specifications required in the optical instrument. In particular, the control circuit 20 may be implemented as a single chip to reduce the magnitude of a driving voltage applied to the lens assembly 10. Thus, the size of an optical device mounted on a portable device may be further reduced. The detailed description thereof will be given below.

Figure 2:
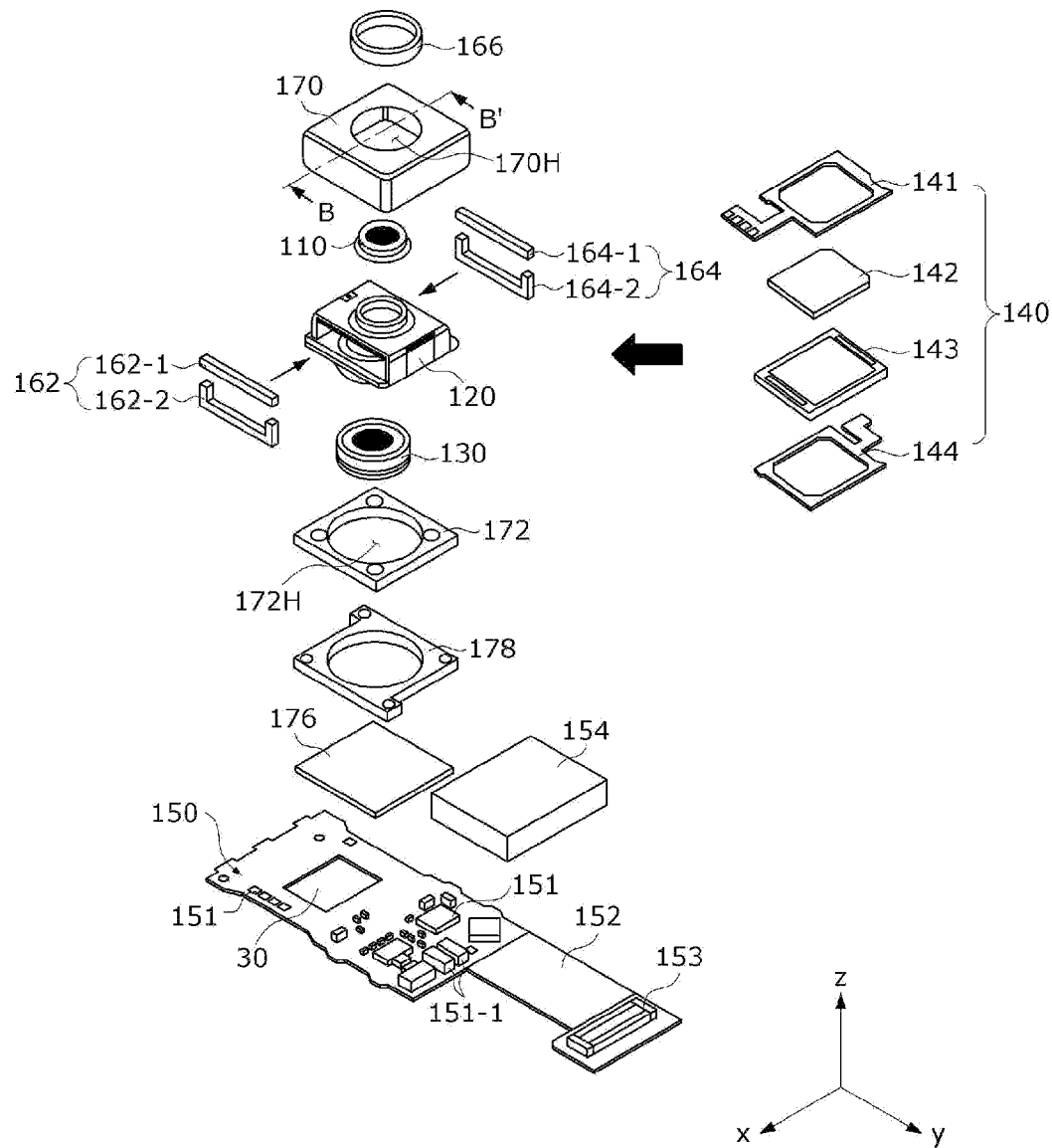
FIG. 2 is an exploded perspective view of the camera module according to the embodiment.
Figure 3:
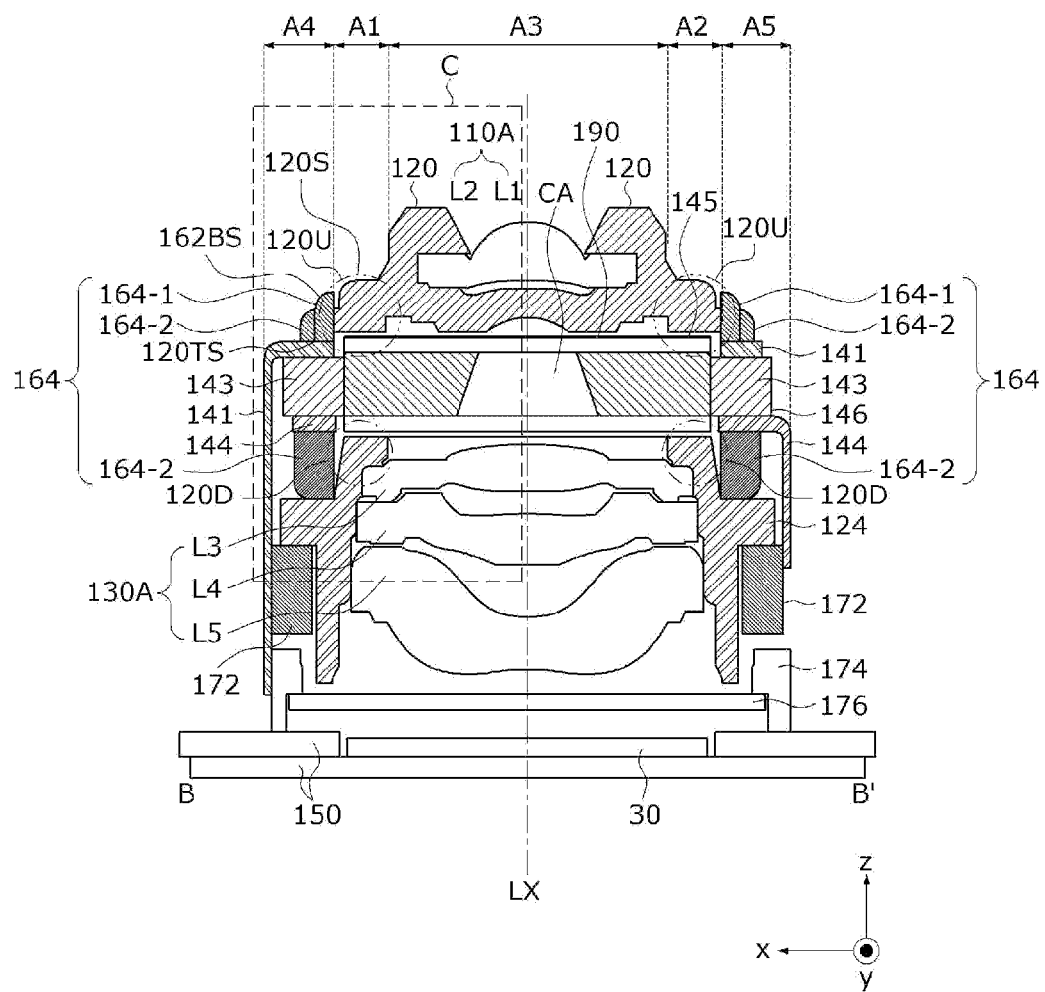
FIG. 3 is a cross-sectional view of the camera module according to the embodiment.
Figure 4:
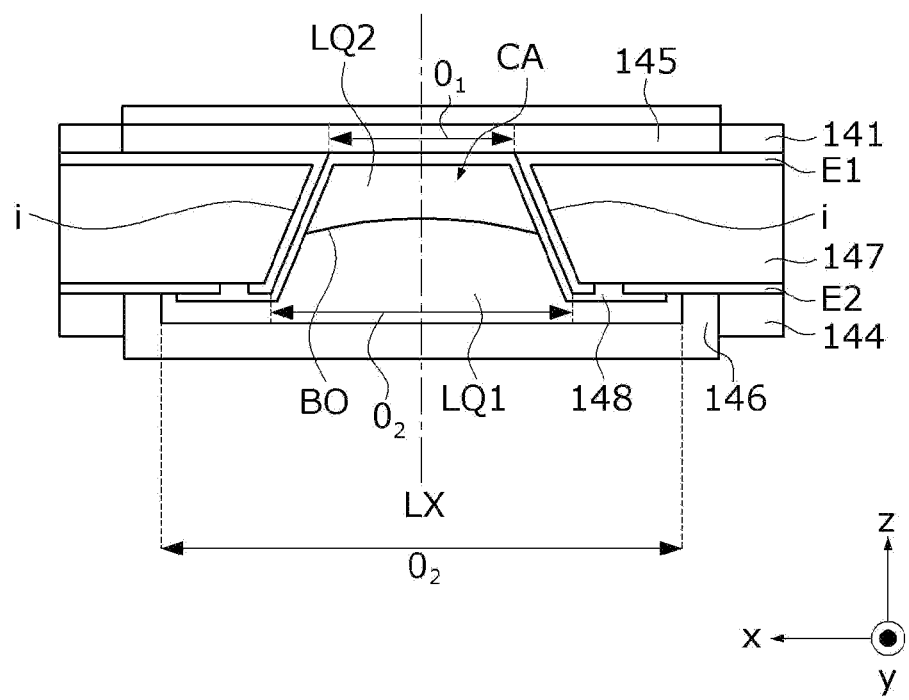
FIG. 4 is a cross-sectional view of a liquid lens unit according to the embodiment.

FIG. 2 is an exploded perspective view of the camera module according to the embodiment, FIG. 3 is a cross-sectional view of the camera module according to the embodiment, and FIG. 4 is a cross-sectional view of the liquid lens unit according to the embodiment.

Referring to FIGS. 2 and 3, the camera module 100 may include the lens assembly, a main substrate 150, and the image sensor 30. In addition, the camera module 100 may further include a first cover 170 and a middle base 172. In addition, the camera module 100 may further include one or more adhesive members 162 and 164 and a second cover 174. The one or more adhesive members serve to couple or fix a liquid lens unit 140 to a holder 120.

Here, the one or more adhesive members are exemplified as including all of a first adhesive member 162, a second adhesive member 164, and a third adhesive member 166, but the embodiment is not limited thereto. That is, according to another embodiment, the one or more adhesive members may also include only some of the first adhesive member 162, the second adhesive member 164, and the third adhesive member 166.

Further, according to the embodiment, at least one of the components 110 to 190 of the camera module 100 illustrated in FIG. 2 may be omitted. Alternatively, at least one component different from the components 110 to 190 illustrated in FIG. 2 may be further added and included in the camera module 100.

For convenience of description, the third adhesive member 166, the first cover 170, the second cover 174, and an optical layer 190 illustrated in FIG. 2 are omitted in FIG. 3.

Further, the lens assembly 10 (see FIG. 1) may include at least one of the liquid lens unit 140, the holder 120, a first lens unit 110, a second lens unit 130, the first adhesive member 162, the second adhesive member 164, and the third adhesive member 166. In addition, the lens assembly may be disposed above the main substrate 150.

In addition, in order to distinguish the first lens unit 110 and the second lens unit 130 from the liquid lens unit 140 in the lens assembly, the first lens unit 110 and the second lens unit 130 may be referred to as a "first solid lens unit" and a "second solid lens unit," respectively.

The first lens unit 110 may be disposed on an upper side of the lens assembly and may be a region on which light is incident from the outside of the lens assembly. That is, the first lens unit 110 may be disposed above the liquid lens unit 140 in the holder 120. The first lens unit 110 may be implemented as a single lens and may be implemented as two or more lenses that are aligned along a central axis to form an optical system. Here, the central axis may be an optical axis LX of the optical system, which is formed by the first lens unit 110, the liquid lens unit 140, and the second lens unit 130 included in the camera module 100, and may be an axis parallel to the optical axis LX. The optical axis LX may be the same as an optical axis f of the image sensor 30.

That is, the first lens unit 110, the liquid lens unit 140, the second lens unit 130, and the image sensor 30 may be aligned and disposed along the optical axis LX through active alignment (AA). Here, the active alignment may be an operation of aligning the optical axes of the first lens unit 110, the second lens unit 130, and the liquid lens unit 140, and adjusting an axis relationship or a distance relationship between the image sensor 30 and the lens units 110, 130, and 140 in order to obtain an improved image.

In one embodiment, the active alignment may be performed by an operation of analyzing image data generated by receiving light, which is incident from a specific object, by the image sensor 30 through at least one of the first lens unit 110, the second lens unit 130, and the liquid lens unit 140. For example, the active alignment may be performed in the following sequence.

As an example, after active alignment (first alignment) that adjusts relative positions between the first and second lens units 110 and 130, which are fixed and mounted to the holder 120 and the image sensor 30, is completed, active alignment (second alignment) that adjusts relative positions between the liquid lens unit 140, which is inserted into the holder 120, and the image sensor 30 may be performed. The first alignment may be performed while a gripper grips the middle base 172 and moves the middle base to various positions, and the second alignment may be performed while the gripper grips a spacer 143 of the liquid lens unit 140 and moves the spacer to various positions. However, the active alignment may be performed in a sequence different from the above-described sequence.

In addition, the holder 120 may include a holder upper region 120U disposed above the liquid lens unit 140 and a holder lower region 120D disposed below the liquid lens unit 140. In this case, the first and second adhesive members 162 and 164 may respectively couple the holder upper region 120U and the holder lower region 120D to the liquid lens unit 140.

In addition, when the first and second adhesive members 162 and 164 are disposed, the liquid lens unit 140 may be stably fixed and coupled to the holder 120.

Further, the first lens unit 110 may include, for example, two lenses L1 and L2, but this is exemplary, and the number of lenses included in the first lens unit 110 may be one or more.

In addition, an exposure lens may be disposed on an upper side of the first lens unit 110. Here, the exposure lens may mean an outermost lens among the lenses included in the first lens unit 110. That is, the lens L1 positioned at the uppermost side of the first lens unit 110 may protrude upward and thus perform a function of the exposure lens. A surface of the exposure lens protrudes to the outside of the holder 120 and thus may be damaged. When the surface of the exposure lens is damaged, the quality of an image captured by the camera module 100 may be degraded. Accordingly, in order to inhibit or suppress damage to the surface of the exposure lens, a cover glass may be disposed, or a coating layer may be formed on an upper portion of the exposure lens. Alternatively, in order to inhibit damage to the surface of the exposure lens, the exposure lens may be implemented using a wear-resistant material having higher rigidity than other lenses in the lens unit.

Further, an outer diameter of each of the lenses L1 and L2 included in the first lens unit 110 may increase toward a lower portion (e.g., in a −z-axis direction), but the embodiment is not limited thereto.

Light incident on the first lens unit 110 from the outside of the camera module 100 may pass through the liquid lens unit 140 and may be incident on the second lens unit 130. The second lens unit 130 may be implemented as a single lens or may be implemented as two or more lenses that are aligned along the central axis to form an optical system. For example, as illustrated in FIG. 3A, the second lens unit 130 may include three lenses L3, L4, and L5, but this is exemplary, and two or less lenses or four or more lenses may be included in the second lens unit 130.

Further, an outer diameter of each of the lenses L3, L4, and L5 included in the second lens unit 130 may increase toward a lower portion thereof (e.g., in the −z-axis direction), but the embodiment is not limited thereto.

In addition, unlike the liquid lens unit 140, each of the first lens unit 110 and the second lens unit 130 may be a solid lens and may be formed of glass or plastic, but the embodiment is not limited to a specific material of each of the first lens unit 110 and the second lens unit 130.

Further, the liquid lens unit 140 may include first to fifth regions A1, A2, A3, A4, and A5. Specifically, the fourth region A4 and the fifth region A5 are positioned on outermost sides of the camera module 100, and the first region A1, the second region A2, and the third region A3 may be disposed between the fourth region A4 and the fifth region A5. In addition, the third region A3 may be disposed between the first region A1 and the second region A2. In addition, the first region A1 may be disposed between the fourth region A4 and the third region A3, and the second region A2 may be disposed between the third region A3 and the fifth region A5.

In other words, the first region A1 and the second region A2 may be regions disposed in openings of side surfaces of the holder 120. The third region A3 may be a region between the first region A1 and the second region A2. In addition, the fourth region A4 and the fifth region A5 are regions that protrude from openings in the holder 120, and are regions disposed outside the holder 120 at the openings.

Hereinafter, the first adhesive member 162 and the second adhesive member 164 will be described, and the liquid lens unit 140 will be described below.

The first adhesive member 162 may include first and second adhesive portions 162-1 and 162-2, and the second adhesive member 164 may include third and fourth adhesive portions 164-1 and 164-2. The adhesive portion may include an adhesive, an epoxy, or the like.

First, the first adhesive portion 162-1 couples the holder 120 and an upper surface 140TS of the fourth region A4 of the liquid lens unit 140, and the third adhesive portion 164-1 couples the holder 120 and an upper surface of the fifth region A5 of the liquid lens unit 140. Here the upper surface 140TS of each of the fourth region A4 and the fifth region A5 of the liquid lens unit 140 is exemplified as being an upper surface of a first connection substrate 141, but the embodiment is not limited thereto. For example, when the liquid lens unit 140 does not include connection substrates 141 and 144 or the spacer 143, the upper surface of the liquid lens unit 140 may be an upper surface of a liquid lens 142.

Further, the holder 120 may include a holder upper portion disposed above the liquid lens unit 140 (or the liquid lens 142) and a holder lower portion disposed below the liquid lens unit 140 (or the liquid lens 142). In addition, the holder 120 may also include a side wall facing a side surface of the liquid lens 142 or the liquid lens unit 140. Each of the first adhesive portion 162-1 and the third adhesive portion 164-1 may couple the holder upper region 120U and the liquid lens unit 140. In this way, each of the first adhesive portion 162-1 and the third adhesive portion 164-1 couples the holder 120 and the liquid lens unit 140 so that the liquid lens unit 140 may be fixed to the holder 120.

Further, the second adhesive portion 162-2 may couple the holder 120 and a lower surface and a side surface of the fourth region A4 of the liquid lens unit 140. Here, the lower surface of the liquid lens unit 140 is exemplified as being a lower surface of a second connection substrate 144, and the side surface of the liquid lens unit 140 is exemplified as being a side surface of the spacer 143, but the embodiment is not limited thereto. For example, when the liquid lens unit 140 does not include the first and second connection substrates 141 and 144 or the spacer 143, the lower surface and the side surface of the liquid lens unit 140 may be the lower surface and the side surface of the liquid lens 142, respectively. Similarly, the fourth adhesive portion 164-2 may couple the holder 120 and a lower surface and a side surface of the fifth region A5 of the liquid lens unit 140. Here, the lower surface of the liquid lens unit 140 may be the lower surface of the second connection substrate 144, and the side surface of the liquid lens unit 140 may be the side surface of the spacer 143, but the embodiment is not limited thereto. For example, when the liquid lens unit 140 does not include the connection substrates 141 and 144 or the spacer 143, the lower surface and the side surface of the liquid lens unit 140 may be the lower surface and the side surface of the liquid lens 142, respectively.

In addition, each of the second adhesive portion 162-2 and the fourth adhesive portion 164-2 may couple the holder lower region 120D and the liquid lens unit 140. In this way, each of the second adhesive portion 162-2 and the fourth adhesive portion 164-2 may couple the holder 120 and the liquid lens unit 140 so that the opening of the holder 120 may be sealed. For example, the first adhesive portion 162-1 and the second adhesive portion 162-2 may be connected to each other, and the third adhesive portion 164-1 and the fourth adhesive portion 164-2 may be connected to each other, thereby performing the above-described sealing.

Although not shown in the drawings, the third adhesive member 166 may be disposed to fill a separation space (or gap) between the upper surface of the holder 120 and the first cover 170. In addition, the third adhesive member 166 may be omitted in some cases. In this case, the separation space between the upper surface of the holder 120 and the first cover 170 may be empty.

The embodiment is not limited to the shapes of the first to third adhesive members 162, 164, and 166 described above. That is, the first to third adhesive members 162, 164, and 166 may have various shapes as long as the adhesive members seal the inside of the holder 120 in order to inhibit an inflow of external foreign substances into the holder 120 through the opening of the holder 120. For example, when the third adhesive member 166 is disposed to fill the separation space between the upper surface of the holder 120 and the first cover 170 in a state in which the first adhesive member 162 and the second adhesive member 164 are disposed to seal the openings of the holder 120, the third region A3 of the liquid lens unit 140 disposed in an inner space of the holder 120 may be sealed from the outside. Accordingly, in the camera module 100 according to the embodiment, reliability against foreign substances can be improved, optical performance degradation can be inhibited, and a defect rate can be reduced.

In addition, each of the first to fourth adhesive portions 162-1, 162-2, 164-1, and 164-2 may have various shapes. That is, the first adhesive portion 162-1, the second adhesive portion 162-2, the third adhesive portion 164-1, and the fourth adhesive portion 164-2 may have shapes corresponding to the shapes of the openings of the holder 120.

In addition, an adhesive may be disposed in the first and second regions A1 and A2 as well as the fourth region A4 and the fifth region A5, but the present invention is not limited thereto.

Further, the above-described first cover 170 may be disposed to surround the holder 120, the liquid lens unit 140, the middle base 172, and a sensor base 178. Accordingly, the first cover 170 may be in contact with a shoulder-side upper surface 120S of the holder 120. In this case, when an upper surface 162S, 164S of each of the first adhesive portion 162-1 and the third adhesive portion 164-1 is positioned higher than the shoulder-side upper surface 120S of the holder 120, the first cover 170 may be in contact with the upper surface 162S of each of the first adhesive portion 162-1 and the third adhesive portion 164-1, instead of the shoulder-side upper surface 120S of the holder 120. Accordingly, the first cover 170 may be unstably fixed to the holder 120. In order to inhibit this, the upper surface 120S of the holder 120 may be disposed to have a difference from the upper surface 162S of the first adhesive portion 162-1 by a predetermined height. Similarly, the upper surface 120S of the holder 120 may be positioned higher than the upper surface 164S of the third adhesive portion 164-1 by a predetermined height.

Further, the height of the upper surface 120S of the holder 120 may be equal to the height of the upper surface 162S of the first adhesive portion 162-1, and the height of the upper surface 120S of the holder 120 may be equal to the height of the upper surface 164S of the third adhesive portion 164-1.

In addition, in the above description, the liquid lens unit 140, which is given when describing the features of the first adhesive member 162 and the second adhesive member 164, includes the first and second connection substrates 141 and 144. However, the liquid lens unit 140, which is given when describing the features of the first adhesive member 162 and the second adhesive member 164 described above, may not include the first and second connection substrates 141 and 144.

Further, the first cover 170 may be disposed to surround the holder 120, the liquid lens unit 140, the third adhesive member 166, and the middle base 172 and may protect these (the holder 120, the liquid lens unit 140, the third adhesive member 166, and the middle base 172) from an external impact. In particular, as the first cover 170 is disposed, the plurality of lenses, which form an optical system, may be protected from an external impact.

Further, the first cover 170 may include an upper opening 170H formed in an upper surface of the first cover 170. Accordingly, the first lens unit 110 disposed in the holder 120 may be exposed to external light.

In addition, the middle base 172 may be disposed to surround the hole of the holder 120. Accordingly, the middle base 172 may include an accommodation hole 172H for accommodating the hole of the holder 120. An inner diameter of the middle base 172 (i.e., a diameter of the accommodation hole 172H) may be greater than or equal to an outer diameter of the hole of the holder 120. In addition, each of the accommodation hole 172H of the middle base 172 and the holes of the holder 120 is illustrated as having a circular shape, but the embodiment is not limited thereto, and these holes may be changed to various shapes. In addition, the middle base 172 may be mounted on the main substrate 150 to be spaced apart from a circuit element 151 on the main substrate 150.

Like the upper opening 170H of the first cover 170, the accommodation hole 172H may be formed at a position near a center of the middle base 172 at a position corresponding to the position of the image sensor 30 disposed on the camera module 100.

Further, the camera module 100 may further include the sensor base 178 and a filter 176 and may further include a circuit cover 154.

The filter 176 may filter light passing through the first lens unit 110, the liquid lens unit 140, and the second lens unit 130 in a specific wavelength range. The filter 176 may be an infrared (IR) light-blocking filter or an ultraviolet (UV) light-blocking filter, but the embodiment is not limited thereto.

Further, the filter 176 may be disposed above the image sensor 30. The filter 176 may be disposed inside the sensor base 178. For example, the filter 176 may be disposed or mounted in an inner recess or on a stepped portion of the sensor base 178.

The sensor base 178 may be disposed below the middle base 172 and attached to the main substrate 150. The sensor base 178 may surround the image sensor 30 and protect the image sensor 30 from external foreign substances or impacts.

Next, the main substrate 150 may be disposed below the middle base 172 and may include a recess in which the image sensor 30 may be mounted, seated, contacted, fixed, provisionally fixed, supported, coupled, or accommodated, the circuit element 151, a connection part (or a flexible printed circuit board (FPCB)) 152, and a connector 153.

Specifically, the main substrate 150 may include a holder region in which the holder 120 is disposed, and an element region in which a plurality of circuit elements 151 are disposed.

The main substrate 150 may be implemented as a rigid-flexible printed circuit board (RFPCB) including the FPCB 152. The FPCB 152 may be bent based on the requirement of a space in which the camera module 100 is mounted.

In addition, the circuit element 151 of the main substrate 150 may configure a control module configured to control the liquid lens unit 140 and the image sensor 30. Here, the control module will be described below.

In addition, the circuit element 151 may include at least one of a passive element and an active element and may have various widths and heights. The circuit element 151 may be provided as a plurality of circuit elements 151 and may protrude outward with a height greater than a height of the main substrate 150. The plurality of circuit elements 151 may be disposed not to overlap the holder 120 in a direction parallel to the optical axis LX. For example, the plurality of circuit elements 151 may include a power inductor, a gyro sensor, and the like, but the embodiment is not limited to a specific type of the circuit element 151.

The circuit cover 154 may be disposed to cover the circuit element 151. Accordingly, the circuit cover 154 may protect the circuit element 151 disposed on an upper portion of the main substrate 150 from an external impact. Further, to this end, the circuit cover 154 may include an accommodation space for accommodating and covering the circuit element 151 in consideration of the shape and position of the circuit element 151 disposed on the main substrate 150. In addition, the circuit cover 154 may have an electromagnetic shielding function.

The image sensor 30 may perform a function of converting light that has passed through the first lens unit 110, the liquid lens unit 140, and the second lens unit 130 of the lens assembly (110, 120, 130, 140, 162, and 164) into image data. More specifically, the image sensor 30 may generate image data by converting light into an analog signal through a pixel array including a plurality of pixels and synthesizing a digital signal corresponding to the analog signal.

Referring to FIGS. 3 and 4, the liquid lens unit 140 may include the first connection substrate (or individual electrode connection substrate) 141, the liquid lens (or liquid lens body) 142, and the second connection substrate (or common electrode connection substrate) 144. In addition, the liquid lens unit 140 may further include the spacer 143 surrounding the liquid lens and disposed between the first connection substrate and the second connection substrate.

The first connection substrate 141 may electrically connect a plurality of first electrodes (not shown) included in the liquid lens 142 to the main substrate 150 and may be disposed above the liquid lens 142. The first connection substrate 141 may be implemented as an FPCB.

Further, the first connection substrate 141 may be electrically connected to an electrode pad 150-1, which is formed on the main substrate 150, through a connection pad 141-1 electrically connected to each of the plurality of first electrodes. To this end, after the liquid lens unit 140 is inserted into the inner space of the holder 120, the first connection substrate 141 may be bent in the −z-axis direction toward the main substrate 150, and then, the connection pad 141-1 and the electrode pad 150-1 may be electrically connected to each other through a conductive epoxy. In another embodiment, the first connection substrate 141 may be connected to a first holder surface electrode, which is conductive and disposed, formed, or coated on a surface of the holder 120, and may be electrically connected to the main substrate 150 through the first holder surface electrode, which is conductive and disposed on the surface of the holder 120, but the embodiment is not limited thereto.

The second connection substrate 144 may electrically connect a second electrode (not shown) included in the liquid lens 142 to the main substrate 150 and may be disposed below the liquid lens 142. The second connection substrate 144 may be implemented as an FPCB or a single metal substrate (conductive metal plate).

Further, the second connection substrate 144 may be electrically connected to an electrode pad, which is formed on the main substrate 150, through a connection pad electrically connected to the second electrode. To this end, after the liquid lens unit 140 is inserted into the inner space of the holder 120, the second connection substrate 144 may be bent in the −z-axis direction toward the main substrate 150. In another embodiment, the second connection substrate 144 may be connected to a surface electrode, which is conductive and is disposed, formed, or coated on the surface of the holder 120, and may be electrically connected to the main substrate 150 through the surface electrode, which is conductive and is disposed on the surface of the holder 120, but the embodiment is not limited thereto.

The liquid lens 142 may include a cavity CA. In addition, an opening area in a direction in which light enters the cavity CA may be smaller than an opening area in an opposite direction. Alternatively, the liquid lens 142 may be disposed such that a direction of inclination of the cavity CA is opposite to that illustrated in the drawing. In addition, the opening area in the direction in which light enters the cavity CA may be greater than the opening area in an opposite direction. In addition, when the liquid lens 142 is disposed such that the direction of inclination of the cavity CA is reversed, according to the direction of inclination of the liquid lens 142, a portion or the entirety of the arrangement of components included in the liquid lens 142 may be changed, or only the direction of inclination of the cavity CA may be changed and the remainder of the arrangement of the components may not be changed.

The spacer 143 may be disposed to surround the liquid lens 142 and may protect the liquid lens 142 from an external impact. To this end, the spacer 143 may have a shape in which the liquid lens 142 may be mounted in, seated in, in contact with, fixed to, provisionally fixed to, supported by, coupled to, or disposed in the spacer 143.

For example, the spacer 143 may include a hollow space 143H in which the liquid lens 142 is accommodated, and a frame configured to surround the hollow space 143H formed in a center thereof. In this way, the spacer 143 may have a centrally-hollowed quadrangular planar shape (hereinafter, referred to as a "□"-shaped form), but the embodiment is not limited thereto.

Further, the spacer 143 may be disposed between the first connection substrate 141 and the second connection substrate 144 and may be disposed to protrude from the opening of the holder 120.

Further, the liquid lens 142 may include a plurality of different types of liquids LQ1 and LQ2, first to third plates 147, 145, and 146, first and second electrodes E1 and E2, and an insulating layer 148. The liquid lens 142 may further include the optical layer 190.

In addition, the plurality of liquids LQ1 and LQ2 may be accommodated in the cavity CA, and may include a first liquid LQ1 having conductivity and a second liquid (or an insulating liquid) LQ2 having non-conductivity. Further, the first liquid LQ1 and the second liquid LQ2 may not be mixed with each other, and an interface BO may be formed at a contact portion between the first and second liquids LQ1 and LQ2. In addition, the second liquid LQ2 may be disposed on the first liquid LQ1, but the embodiment is not limited thereto.

Further, in a cross-sectional shape of the liquid lens 142, an edge of each of the first and second liquids LQ1 and LQ2 may be thinner than a central portion thereof. However, the present invention is not limited thereto.

An inner side surface of the first plate 147 may form a sidewall i of the cavity CA. The first plate 147 may include upper and lower openings having a predetermined inclined surface. That is, the cavity CA may be a region surrounded by the inclined surface of the first plate 147, the second plate 145, and the third plate 146.

Further, according to the embodiment, a size (or an area or a width) O2 of the lower opening may be larger than a size (or an area or a width) O1 of the upper opening. Here, the size of each of the upper and lower openings may be a sectional area in a horizontal direction (e.g., an x-axis direction and a y-axis direction). For example, the size of the opening may be a radius when the opening has a circular cross section and may be a diagonal length when the opening has a square cross section. In addition, a diameter of the opening may be changed depending on a field of view (FOV) required for the liquid lens 142 or the role of the liquid lens 142 to be performed in the camera module 100.

In addition, each opening may have the form of a hole having a circular cross section, and an inclined surface thereof may have an inclination. The interface BO may move along the inclined surface of the cavity CA by a driving voltage.

In addition, as described above, the first liquid LQ1 and the second liquid LQ2 may be fill, accommodated, or disposed in the cavity CA. In addition, the cavity CA is a portion through which the light that has passed through the first lens unit 110 is transmitted. Further, since the first plate 147 is positioned outside the cavity CA, the first plate 147 may be made of a transparent material. In addition, the first plate 147 may include impurities so that light is not easily transmitted therethrough.

In addition, the electrode may be disposed on each of one surface and the other surface of the first plate 147. A plurality of first electrodes E1 may be disposed to be spaced apart from the second electrode E2 and disposed on one surface (e.g., an upper surface, a side surface, or a lower surface) of the first plate 147. The second electrode E2 may be disposed on at least a partial region of the other surface (e.g., a lower surface) of the first plate 147 and may be in direct contact with the first liquid LQ1.

Further, the first electrodes E1 may include n electrodes (hereinafter, referred to as "individual electrodes"), and the second electrode E2 may include a single electrode (hereinafter, referred to as a "common electrode"). Here, n may be an integer greater than or equal to 2. Here, a case of four first electrodes E1 and one second electrode E2 will be described below. That is, both ends electrically connected to the liquid lens 142 may be any one of the plurality of first electrodes E1 and the second electrode E2.

Further, a portion of the second electrode E2 (i.e., an electrode sector of the second electrode E2) disposed on the other surface of the first plate 147 may be exposed to the first liquid LQ1 having conductivity.

Each of the first and second electrodes E1 and E2 may be made of a conductive material. For example, the first electrode E1 and the second electrode E2 may be made of a metal.

Further, the second plate 145 may be disposed on one surface of the first electrode E1. That is, the second plate 145 may be disposed above the first plate 147. Specifically, the second plate 145 may be disposed above an upper surface of the first electrode E1 and the cavity CA.

The third plate 146 may be disposed on one surface of the second electrode E2. That is, the third plate 146 may be disposed below the first plate 147. Specifically, the third plate 146 may be disposed below a lower surface of the second electrode E2 and the cavity CA.

The second plate 145 and the third plate 146 may be disposed opposite to each other with the first plate 147 interposed therebetween. In addition, at least one of the second plate 145 and the third plate 146 may be omitted.

At least one of the second and third plates 145 and 146 may have a quadrangular planar shape. The third plate 146 may be brought into contact with and bonded to the first plate 147 in a bonding region thereof around the edge.

The second plate 145 and the third plate 146 are regions through which light passes, and may be made of a transparent material. For example, each of the second and third plates 145 and 146 may be made of glass, and may be formed of the same material for convenience of the process. In addition, the edge of each of the second and third plates 145 and 146 may have a quadrangular shape, but the present invention is not necessarily limited thereto.

In addition, the second plate 145 may allow light incident from the first lens unit 110 to enter the cavity CA of the first plate 147.

Further, the third plate 146 may allow the light that has passed through the cavity CA of the first plate 147 to travel to the second lens unit 130. The third plate 146 may be in direct contact with the first liquid LQ1.

According to the embodiment, the third plate 146 may have a diameter larger than a diameter of a wider opening among the upper and lower openings of the first plate 147. In addition, the third plate 146 may include a peripheral region spaced apart from the first plate 147.

For example, an actual effective lens region of the liquid lens 142 may be narrower than the diameter (e.g., O2) of the wider opening among the upper and lower openings of the first plate 147. That is, when a region in a small radius about a central portion of the liquid lens 142 is used as an actual path for transmitting light, a diameter O3 of a central region of the third plate 146 may be smaller than a diameter (e.g., O2) of a wider opening among third and fourth openings of the first plate 147.

The insulating layer 148 may be disposed to cover a portion of a lower surface of the second plate 145 in an upper region of the cavity CA. That is, the insulating layer 148 may be disposed between the second liquid LQ2 and the second plate 145.

Further, the insulating layer 148 may be disposed to cover a portion of the first electrode E1 that forms a sidewall of the cavity CA. In addition, the insulating layer 148 may be disposed on a lower surface of the first plate 147 to cover a portion of the first electrode E1, the first plate 147, and the second electrode E2. Accordingly, the insulating layer 148 may block the first electrode E1 from coming into contact with the first liquid LQ1 and block the first electrode E1 from coming into contact with the second liquid LQ2.

The insulating layer 148 may cover one electrode (e.g., the first electrode E1) of the first and second electrodes E1 and E2 and may expose a portion of another one electrode (e.g., the second electrode E2) so that electric energy is applied to the first liquid LQ1 having conductivity.

Meanwhile, the optical layer 190 may be disposed on one surface of at least one of the second plate 145 and the third plate 146. For example, the optical layer 190 may be disposed on at least one of upper and lower portions of the second plate 145, may be disposed on at least one of upper and lower portions of the third plate 146, or may be disposed on at least one of upper and lower portions of each of the second and third plates 145 and 146.

In addition, the liquid lens 142 and the optical layer 190 are illustrated separately from each other, but the optical layer 190 may be a component of the liquid lens 142. In addition, the optical layer 190 is illustrated as being a single layer, but this is only to indicate the presence of the optical layer 190. That is, the optical layer 190 may be a single layer or a multilayer.

In addition, the optical layer 190 may include at least one of an ultraviolet light-blocking layer, an anti-reflection layer, and an infrared light-blocking layer. The optical layer 190 may be disposed to overlap the image sensor 30 in a direction of the optical axis LX (i.e., a z-axis) or in a direction parallel to the optical-axis direction. In addition, the optical layer 190 may be disposed in the third region A3 of the liquid lens unit 140. For example, the ultraviolet light-blocking layer may block ultraviolet light, particularly, light in the UV-A region. The ultraviolet light-blocking layer may be disposed in a region through which light is incident to the liquid lens 142, and may block ultraviolet light, particularly, light in the UV-A region, which may be transmitted from the first lens unit 110. UV-C light has a relatively short wavelength and thus low penetration force, and accordingly, most UV-C light is blocked by an ozone layer. UV-B is blocked by general glass, but UV-A light passes through general glass, and accordingly, may particularly require a separate blocking layer. In addition, the anti-reflection layer may serve to inhibit light from being reflected from the second plate 145 or the third plate 146, may reduce a decrease in light transmittance due to Fresnel loss in the liquid lens 142, and may inhibit a decrease in visibility of the liquid lens 142 at night. In particular, although not shown in the drawings, the anti-reflection layer may be disposed on an inclined surface and a lower surface of the insulating layer 148, and may inhibit a decrease in the quality of light transmitted to the image sensor 30 due to the reflection of light.

In addition, the infrared light-blocking (IR cut-off) layer may block light in an infrared region. The infrared light-blocking layer may remove hot spots from an image by inhibiting external infrared light from being incident on the liquid lens 142, and may inhibit a decrease in visibility at night by reducing the reflection of light from a surface of the liquid lens 142.

In addition, at least one of the ultraviolet light-blocking layer, the anti-reflection layer, and the infrared light-blocking layer may be disposed on at least one of a light-receiving portion and a light-emitting portion of the camera module 100 according to the embodiment.

In addition, according to the embodiment, the optical layer 190 may have a coated form or a film form. For example, the anti-reflection layer of the optical layer 190 may be formed by coating at a low temperature by a spray method or the like.

FIGS. 5A to 5E are views for describing a method of driving the liquid lens unit. In the following description, a voltage will be described as being applied between the first electrode and the second electrode. In addition, the corresponding voltage may be the same as the driving voltage, which will be described below.

Figure 5A:
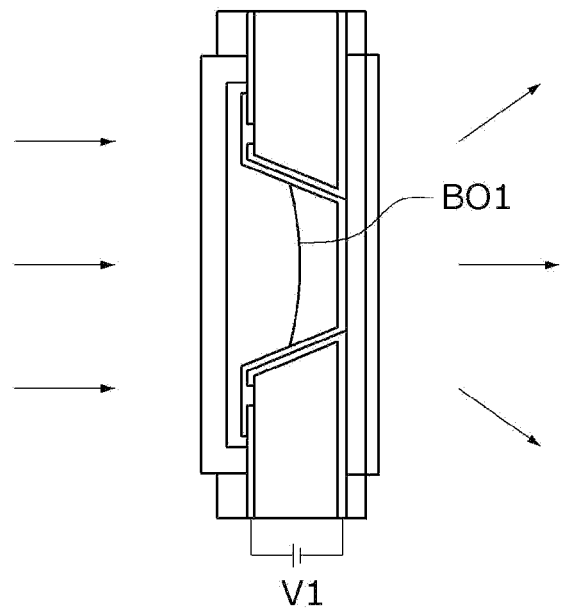
FIGS. 5A to 5E are views for describing a method of driving the liquid lens unit.
Figure 5B:
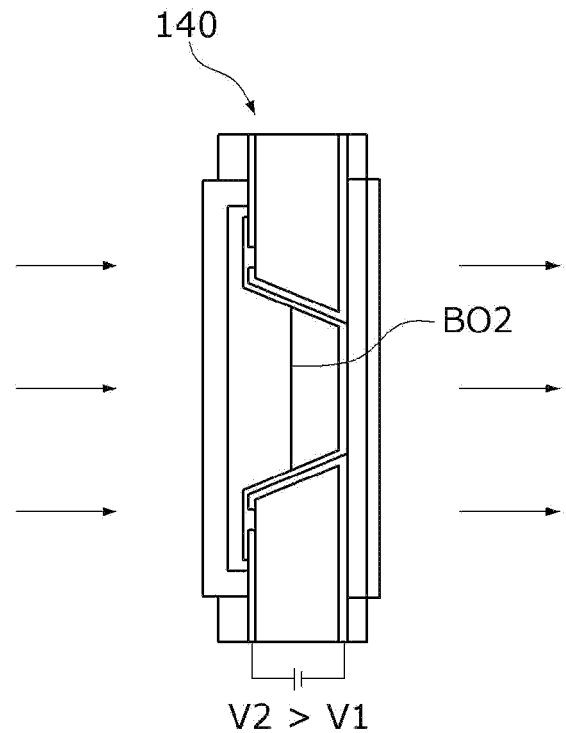

First, in FIG. 5A, a first voltage V1 is applied to the liquid lens unit 140 so that an interface BO1 of the liquid lens may be convex in a light traveling direction. Thus, it is illustrated that the liquid lens unit operates as a concave lens. In addition, in FIG. 5B, a second voltage V2 greater than the first voltage V1 is applied to the liquid lens unit 140 so that an interface BO2 of the liquid lens may be perpendicular to the light traveling direction. Thus, it is illustrated that the liquid lens unit does not change the light traveling direction. In addition, in FIG. 5C, a third voltage V3 greater than the second voltage V2 is applied to the liquid lens unit 140 so that an interface BO3 of the liquid lens may be convex in a direction opposite to the light traveling direction. Thus, it is illustrated that the liquid lens unit operates as a convex lens. In this case, when the first to third voltages V1 to V3 are applied, the interfaces BO1, BO2, and BO3 of the liquid lens in the liquid lens unit 140 may have different curvatures.

That is, in the liquid lens unit 140 according to the embodiment, it is illustrated that the curvature or diopter of the liquid lens of the liquid lens unit is changed depending on the level of the applied voltage, but the present invention is not limited thereto, and the curvature or diopter of the liquid lens may also be changed depending on a pulse width of an applied pulse.

Figure 5C:
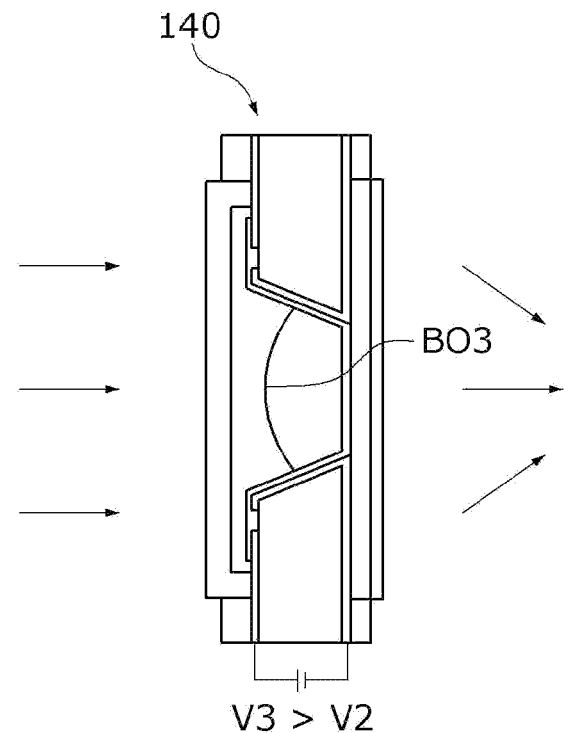
Figure 5D:
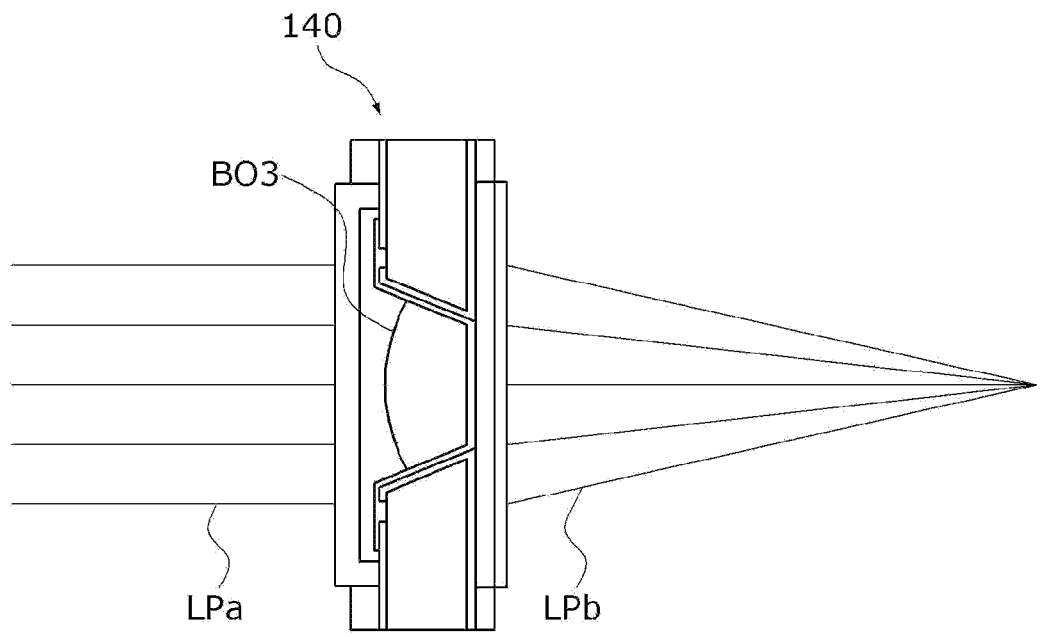

In addition, FIG. 5D illustrates that the liquid lens in the liquid lens unit 140 operates as a convex lens as the liquid lens in the liquid lens unit 140 has an interface the same as the interface BO3 as in FIG. 5C. Thus, according to FIG. 5D, incident light LPa is converged, and corresponding output light LPb is output.

Figure 5E:
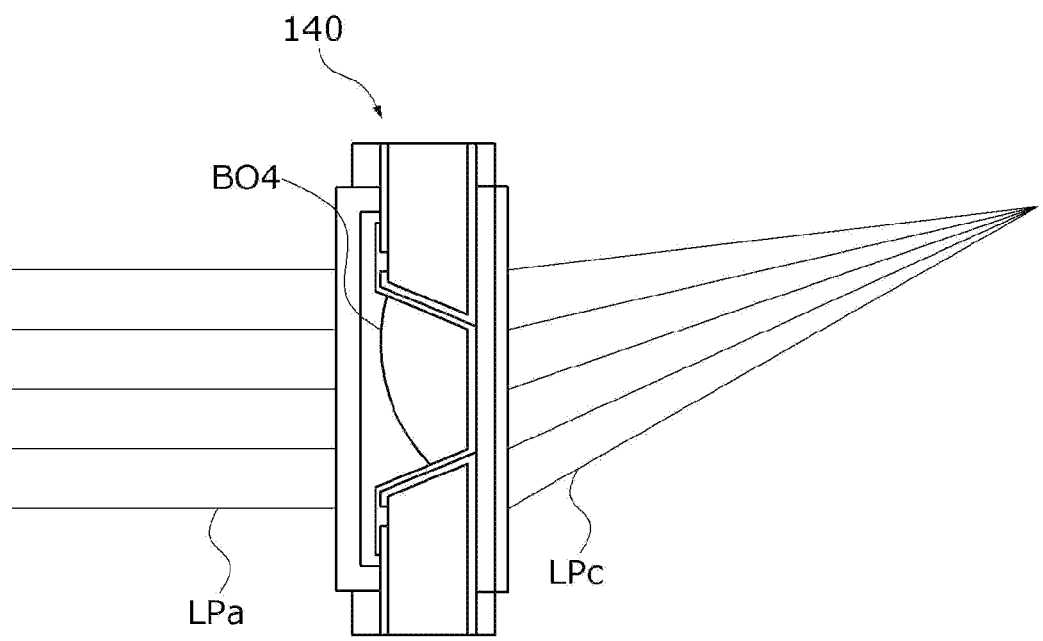

In addition, FIG. 5E illustrates that the liquid lens in the liquid lens unit 140 has an asymmetric curved surface (e.g., an upper portion of the interface is convex in a direction opposite to the light traveling direction), so that the light traveling direction is changed to one side (e.g., an upper side). That is, according to FIG. 5D, the incident light LPa is converged to the upper side, and corresponding output light LPc is output.

Figure 6:
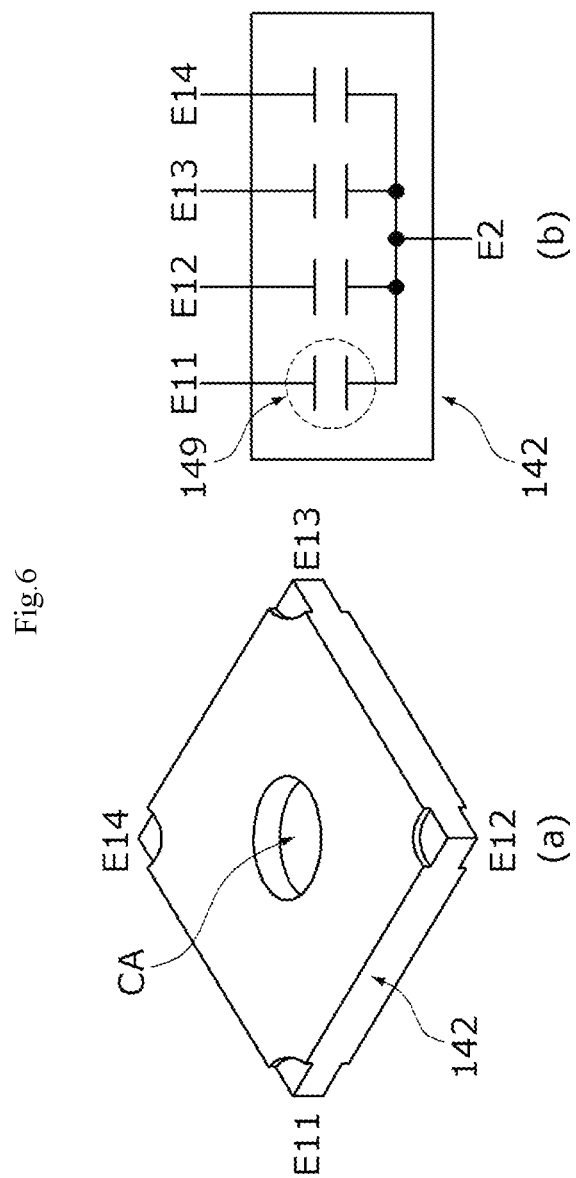
FIG. 6 is a view for describing the liquid lens unit in which an interface is adjusted according to a driving voltage.

FIG. 6 is a view for describing the liquid lens unit in which the interface is adjusted according to a driving voltage.

Referring to FIG. 6, FIG. 6A illustrates the liquid lens unit, and FIG. 6B illustrates an equivalent circuit of the liquid lens unit.

Referring to FIG. 6A, a lens 142 whose focal length is adjusted according to a driving voltage may receive the voltage through individual terminals L1, L2, L3, and L4 that are disposed in four different directions to have the same angular distance therebetween. The individual terminals may be disposed with the same angular distance therebetween with respect to a central axis of the liquid lens and may include four individual terminals. Each of the four individual terminals may be disposed at one of four corners of the liquid lens. When a voltage is applied through the individual terminals L1, L2, L3, and L4, an interface of the liquid lens may be deformed by a driving voltage, which is formed due to interaction between the applied voltage and a voltage applied to a common terminal CO, which will be described below.

Further, referring to FIG. 6B, the liquid lens 142 may have one side to which an operating voltage is applied from the different individual terminals L1, L2, L3, and L4 and another side electrically connected to the common terminal CO. In addition, the common terminal CO may be connected to a plurality of capacitors 149. In addition, the plurality of capacitors 149 included in the equivalent circuit may have a small capacitance of about tens to about 200 pico-farads (pF) or less. The terminals of the liquid lens may be referred to as electrode sectors or sub-electrodes.

Figure 7B:
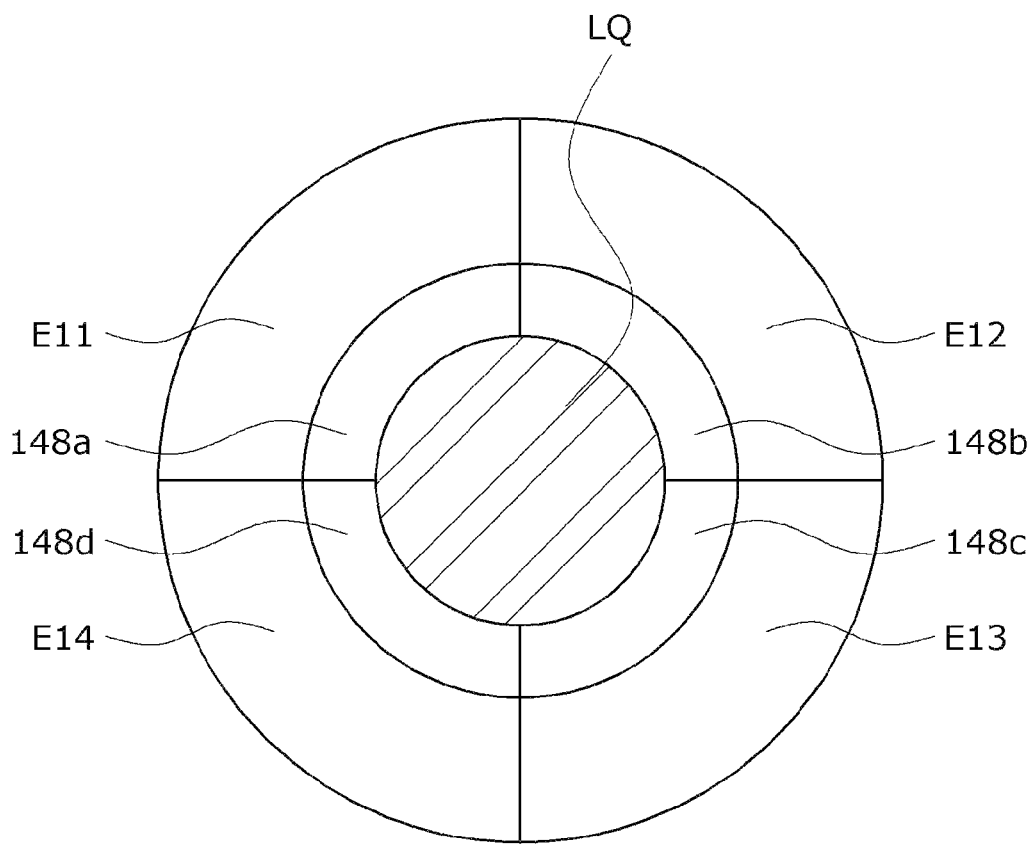
Figure 7C:
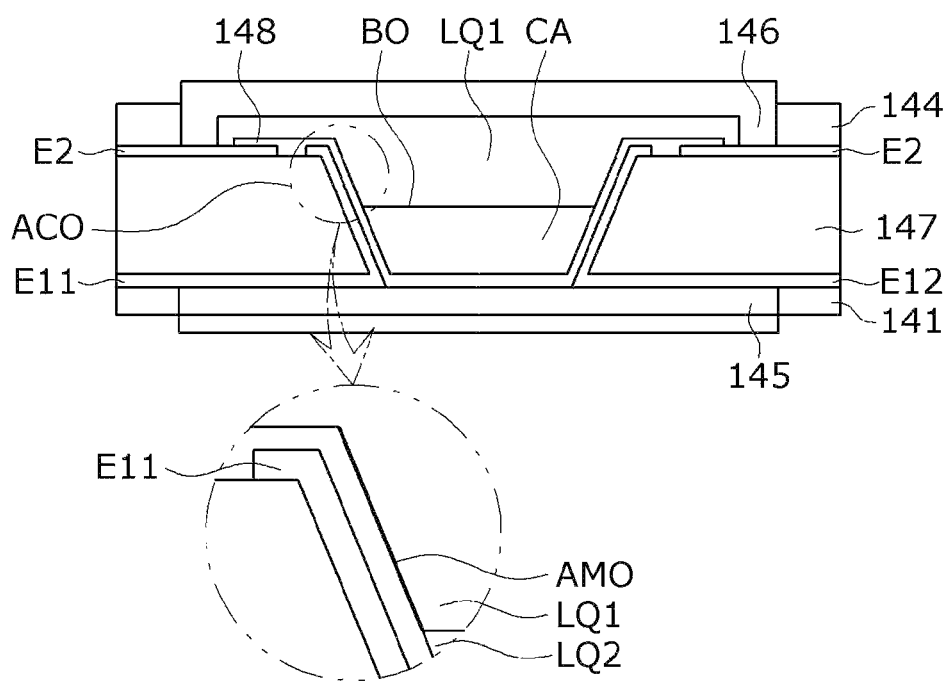

FIGS. 7A to 7C are views illustrating a structure of the liquid lens unit.

Referring to FIG. 7A, the liquid lens unit 140 may include a common electrode E2 (corresponds to the second electrode, and hereinafter, the second electrode and the common terminal are used interchangeably) at one side thereof. In this case, the common electrode E2 may be disposed in the form of a tube, and a liquid LQ may be disposed in a lower region of the common electrode E2, in particular, in a region corresponding to a hollow.

Meanwhile, although not shown in the drawing, in order to insulate the common electrode E2, an insulating layer may be disposed between the common electrode E2 and the liquid.

In addition, as shown in FIG. 7B, a plurality of first electrodes E11 to E14 (the first electrodes correspond to the individual electrodes, and hereinafter, the first electrodes and the individual terminals are used interchangeably) may be disposed below the common electrode, in particular, below the liquid LQ. The plurality of first electrodes E11 to E14, in particular, may be disposed in a shape surrounding the liquid LQ.

In addition, a plurality of insulating layers 148a to 148d for insulation may be respectively disposed between the plurality of first electrodes E11 to E14 and the liquid LQ.

Referring to FIG. 7C, the liquid lens unit 140 may include the plurality of first electrodes E11, E12, E13, and E14 disposed on the first connection substrate 141, the plurality of insulating layers 148a to 148d for insulating the first electrodes E11, E12, E13, and E14, the second liquid LQ2 disposed on the first electrodes E11, E12, E13, and E14, the first liquid LQ1 disposed on the second liquid LQ2, the second electrode E2 disposed apart from the second liquid LQ2 and the first electrodes E11, E12, E13, and E14, and the second connection substrate 144 disposed on the second electrode E2. In other configurations, the above-described contents may be applied.

Further, the second electrode E2 may be formed in the form of a tube with a hollow. In addition, the second liquid LQ2 and the first liquid LQ1 may be disposed in a hollow region. The second liquid LQ2 may be disposed in a circular shape as shown in FIGS. 7A and 7B.

Meanwhile, the hollow region may have a size that increases in a direction from bottom to top, and accordingly, each of the first electrodes E11, E12, E13, and E14 may have a size that decreases in a direction from bottom to top.

In FIG. 7C, a first-first electrode E11 and a first-second electrode E12 among the first electrodes E11, E12, E13, and E14 are each illustrated as being formed to be inclined and having a size that decreases in a direction from bottom to top. Meanwhile, unlike FIGS. 7A to 7C, the first electrodes E11, E12, E13, and E14 may be positioned above the second electrode E2. In other words, the first electrodes E11, E12, E13, and E14 may be positioned below the second electrode E2, but the present invention is not limited thereto.

Further, the first electrodes E11, E12, E13, and E14 are not limited to the above-described number and may be formed in various numbers.

Further, when a pulse-type electrical signal is applied to the first-first electrode E11 and the first-second electrode E12 after the pulse-type electrical signal is applied to the second electrode E2 and a predetermined period of time elapses, a potential difference is generated between the second electrode E2, the first-first electrode E11, and the first-second electrode E12, and accordingly, a shape of the first liquid LQ1 having electrical conductivity may be changed, and a shape of the second liquid LQ2 inside the second liquid LQ2 may be changed according to the change in the shape of the first liquid LQ1.

Meanwhile, in the present invention, proposed is a method of simply and quickly detecting the curvature of the second liquid LQ2 that changes according to an electrical signal applied to each of the first electrodes E11, E12, E13, and E14 and the second electrode E2. To this end, a sensor unit of the present invention may detect a size of an area or a change in the area of a boundary region Ac0 between the first liquid LQ1 and the first insulator 148a on the first electrode E11 in the liquid lens unit 140.

In FIG. 7C, AM0 is exemplarily given as an area of the boundary region Ac0. In particular, it is illustrated that the area of the boundary region Ac0, which is in contact with the first liquid LQ1, of an inclined portion of a first insulating layer 148a on the first-first electrode E11 is AM0.

In addition, it is illustrated that the second liquid LQ2 is not concave or convex and is parallel to the first connection substrate 141 and the like. The curvature at this point may be defined as, for example zero.

For the boundary region Ac0, which is in contact with the first liquid LQ1, of the inclined portion of the first insulating layer 148a on the first-first electrode E11, a capacitance C may be formed according to Equation 1.

$$C = \varepsilon \frac{A}{d}$$ Equation 1

Here, ε denotes a dielectric constant of a dielectric 148a, A denotes the area of the boundary region Ac0, and d denotes a thickness of the first dielectric 148a. The capacitance C may be a capacitance of the capacitor 149 illustrated in FIG. 6. Accordingly, since the above-described sensor unit detects the capacitance of the capacitor 149, and the sensor unit may include the capacitor 149.

In addition, when it is assumed here that c and d are fixed values, the area of the boundary region Ac0 may greatly affect the capacitance C. That is, as the area of the boundary region Ac0 increases, the capacitance C formed in the boundary region Ac0 may increase. Meanwhile, since the area of the boundary region Ac0 is varied as the curvature of the second liquid LQ2 is varied, the area of the boundary region Ac0 or the capacitance C formed in the boundary region Ac0 may be detected using the sensor unit.

Meanwhile, in the present specification, the capacitance in FIG. 7C may be defined as CAc0.

FIGS. 8A to 8E are views for describing a variation in the lens curvature of the liquid lens unit.

FIGS. 8A to 8E illustrate that a first curvature BOa is formed in the second liquid LQ2 according to the application of an electrical signal to each of the first electrodes E11, E12, E13, and E14 and the second electrode E2.

Figure 8A:
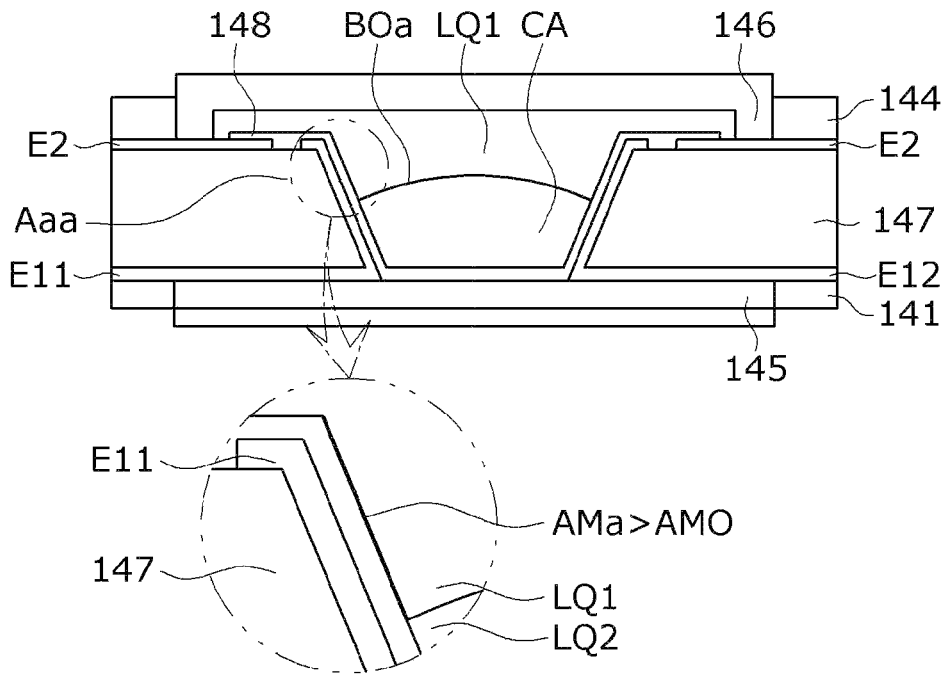

In FIG. 8A, it is illustrated that an area of a boundary region Aaa is AMa (>AM0) when the first curvature BOa is formed in the second liquid LQ2. In particular, it is illustrated that the area of the boundary region Aaa, which is in contact with an electroconductive aqueous solution LQ1, of the inclined portion of the first insulating layer 148a on the first-first electrode E11 is AMa.

According to Equation 1, the area of the boundary region Aaa in FIG. 8A is larger than that in FIG. 7C, and thus the capacitance of the boundary region Aaa becomes larger. Meanwhile, the capacitance in FIG. 8A may be defined as CAaa, which is greater than CAc0 that is the capacitance in FIG. 7C. In addition, the first curvature BOa at this point may be defined as having a value of positive polarity. For example, the first curvature BOa may be defined as having a level of +2.

Figure 8B:
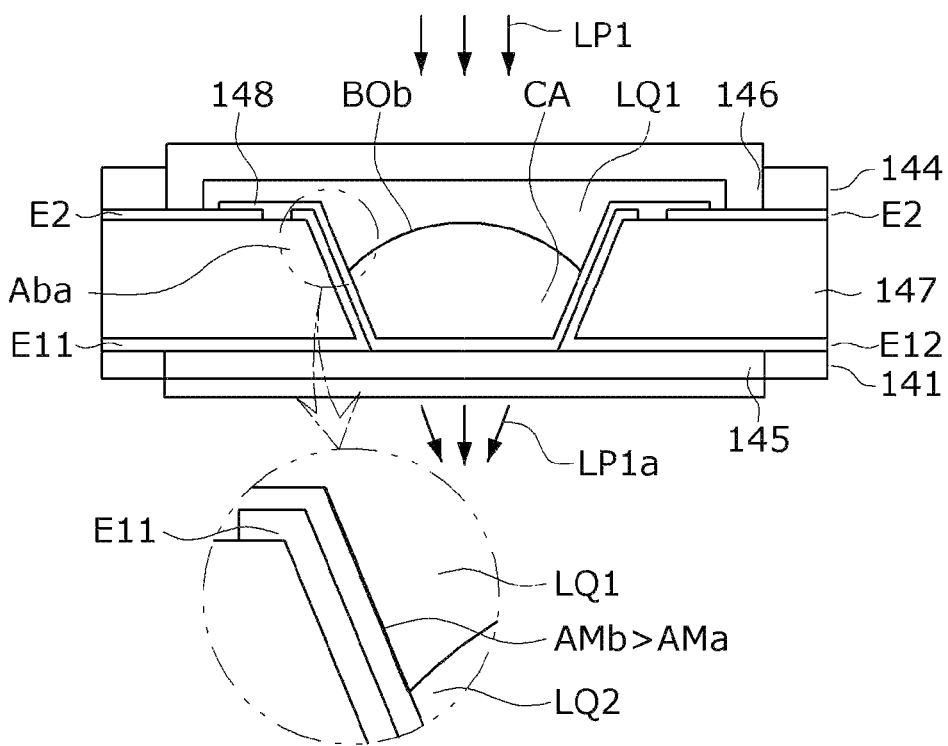

FIG. 8B illustrates that a second curvature Bob is formed in the second liquid LQ2 according to application of an electrical signal to each of the first electrodes E11, E12, E13, and E14 and the second electrode E2.

Referring to FIG. 8B, it is illustrated that an area of a boundary region Aba is AMb (>AMa) when the second curvature Bob is formed in the second liquid LQ2. In particular, it is illustrated that the area of the boundary region Aba, which is in contact with the first liquid LQ1, of the inclined portion of the first insulating layer 148a on the first-first electrode E11 is AMb.

According to Equation 1, the area of the boundary region Aba in FIG. 8B is larger than that in FIG. 8A, and thus the capacitance of the boundary region Aba becomes larger. Meanwhile, the capacitance in FIG. 8B may be defined as CAba, which is greater than CAaa that is the capacitance in FIG. 8A.

The second curvature BOb at this point may be defined as having a value of positive polarity greater than the first curvature BOa. For example, the second curvature BOb may be defined as having a level of +4.

Meanwhile, according to FIGS. 8A and 8B, the liquid lens unit 140 operates as a convex lens, and accordingly, output light LP1*a* formed by converging incident light LP1 is output.

Figure 8C:
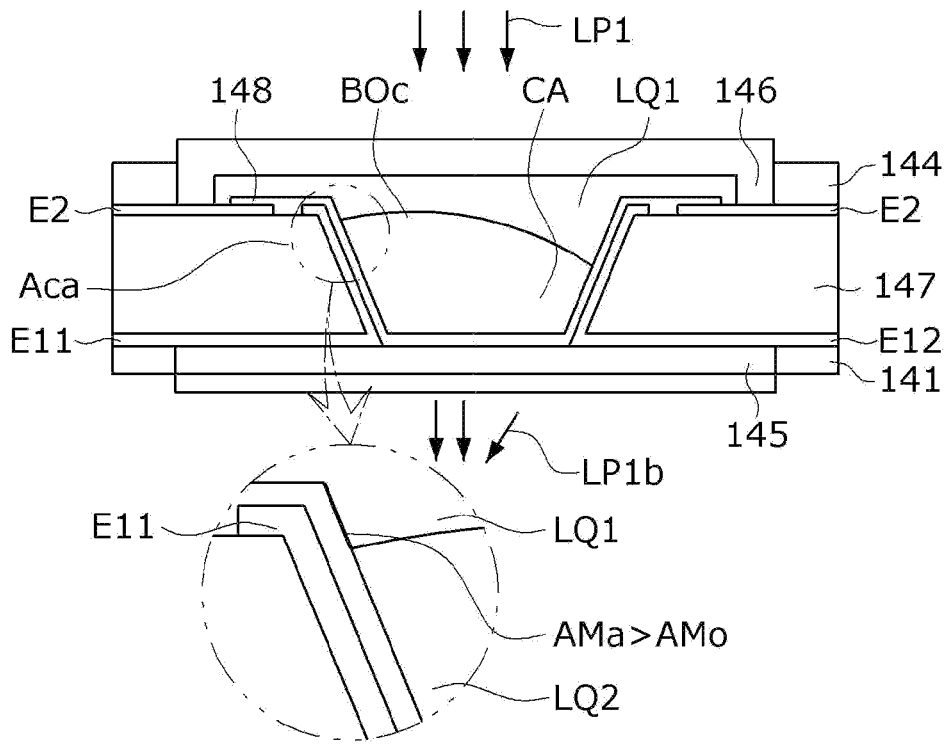

Next, FIG. 8C illustrates that a third curvature BOc is formed in the second liquid LQ2 according to application of an electrical signal to each of the first electrodes E11, E12, E13, and E14 and the second electrode E2.

In particular, in FIG. 8C, it is illustrated that an area of a left boundary region Aca is AMa and an area of a right boundary region Acb is AMb (>AMa).

In particular, it is illustrated that the area of the boundary region Aca, which is in contact with the first liquid LQ1, of the inclined portion of the first insulating layer 148*a* on the first-first electrode E11 is AMa, and the area of the boundary region Acb, which is in contact with the first liquid LQ1, of the inclined portion of the second insulator 148*b* on the second electrode E12 is AMb.

Accordingly, the capacitance of the left boundary region Aca may be CAaa, and the capacitance of the right boundary region Acb may be CAba. The third curvature BOc at this point may be defined as having a value of positive polarity. For example, the third curvature BOc may be defined as having a level of +3. Meanwhile, according to FIG. 8C, the liquid lens unit 140 operates as a convex lens, and accordingly, output light LP1*b* formed by converging incident light LP1 further to one side may be output.

Figure 8D:
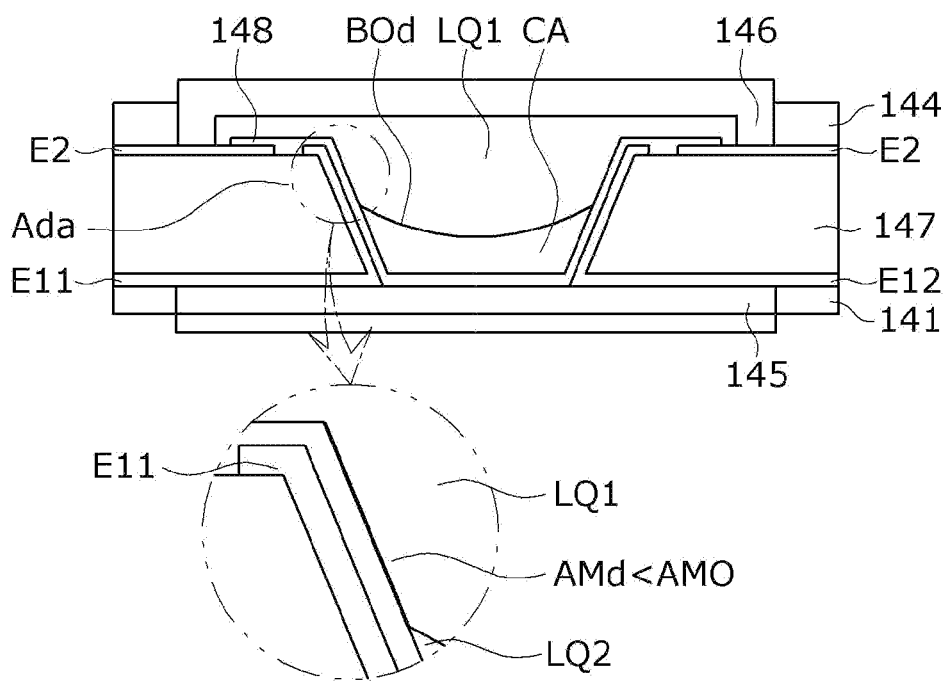

Next, FIG. 8D illustrates that a fourth curvature BOd is formed in the second liquid LQ2 according to application of an electrical signal to each of the first electrodes E11, E12, E13, and E14 and the second electrode E2.

In FIG. 8D, it is illustrated that an area of a boundary region Ada is AMd (<AM0) when the fourth curvature BOd is formed in the second liquid LQ2. In particular, it is illustrated that the area of the boundary region Ada, which is in contact with the first liquid LQ1, of the inclined portion of the first insulating layer 148*a* on the first-first electrode E11 is AMd.

According to Equation 1, the area of the boundary region Ada in FIG. 8D is smaller than that in FIG. 8C, and thus the capacitance of the boundary region Ada becomes smaller. Meanwhile, the capacitance in FIG. 8D may be defined as CAda, which is smaller than CAc0 that is the capacitance in FIG. 7C.

The fourth curvature BOd at this point may be defined as having a value of negative polarity. For example, the fourth curvature BOd may be defined as having a level of −2.

Next, FIG. 8E illustrates that a fifth curvature BOe is formed in the second liquid LQ2 according to application of an electrical signal to each of the first electrodes E11, E12, E13, and E14 and the second electrode E2.

In FIG. 8E, it is illustrated that an area of a boundary region Aea is AMe (<AMd) when the fifth curvature BOe is formed in the second liquid LQ2. In particular, it is illustrated that the area of the boundary region Aea, which is in contact with the first liquid LQ1, of the inclined portion of the first insulating layer 148*a* on the first-first electrode E11 is AMe.

According to Equation 1, the area of the boundary region Aea in FIG. 8E is smaller than that in FIG. 8D, and thus the capacitance of the boundary region Aea becomes smaller. Meanwhile, the capacitance in FIG. 8E may be defined as CAea, which is smaller than CAda that is the capacitance in FIG. 8D. The fifth curvature BOe at this point may be defined as having a value of negative polarity. For example, the fifth curvature BOe may be defined as having a level of −4.

Meanwhile, according to FIGS. 8D and 8E, the liquid lens unit 140 operates as a concave lens, and accordingly, output light LP1*c* formed by diverging incident light LP1 is output.

Figure 9:
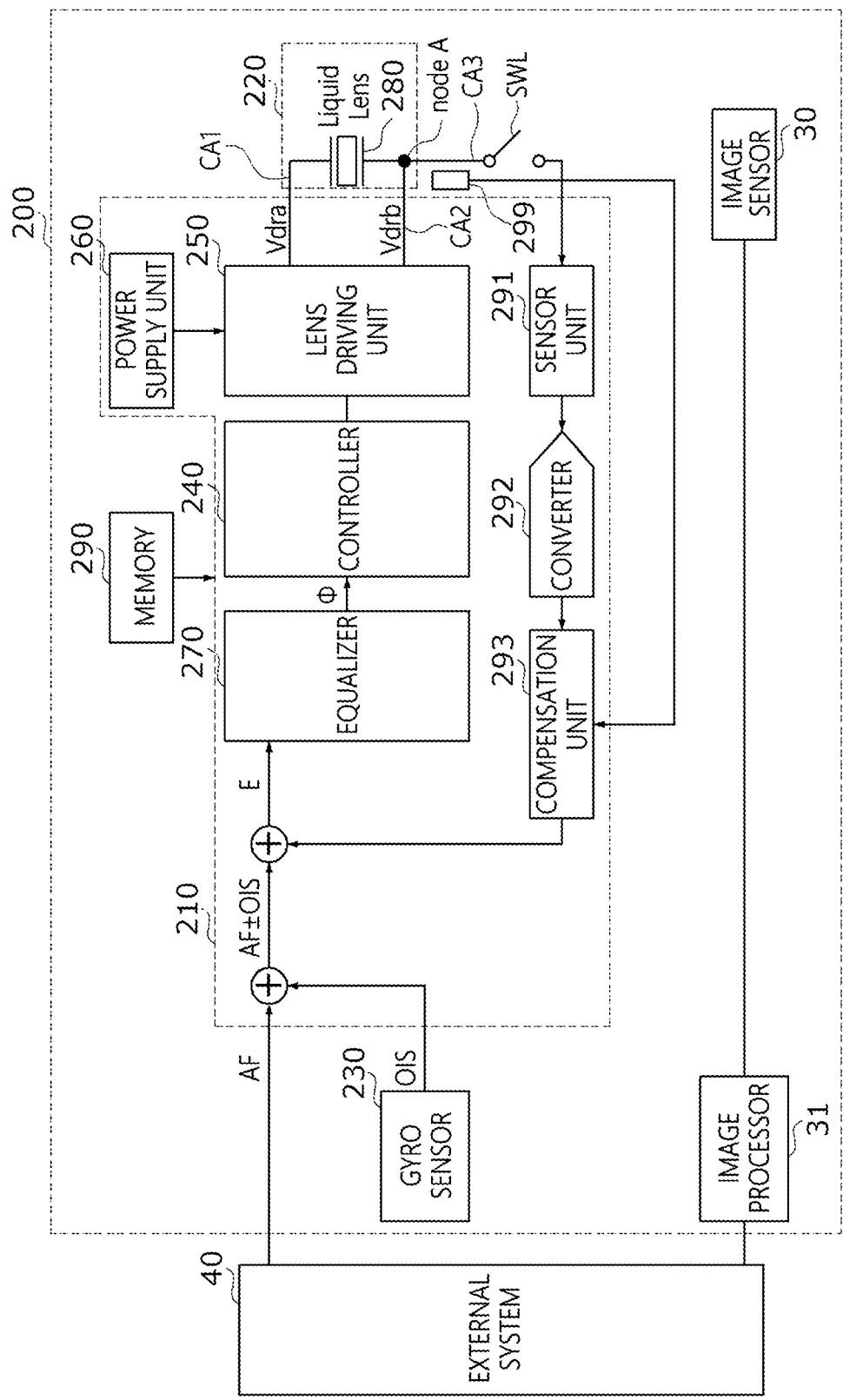
FIG. 9 is a block diagram of the camera module according to the embodiment.
Figure 10:
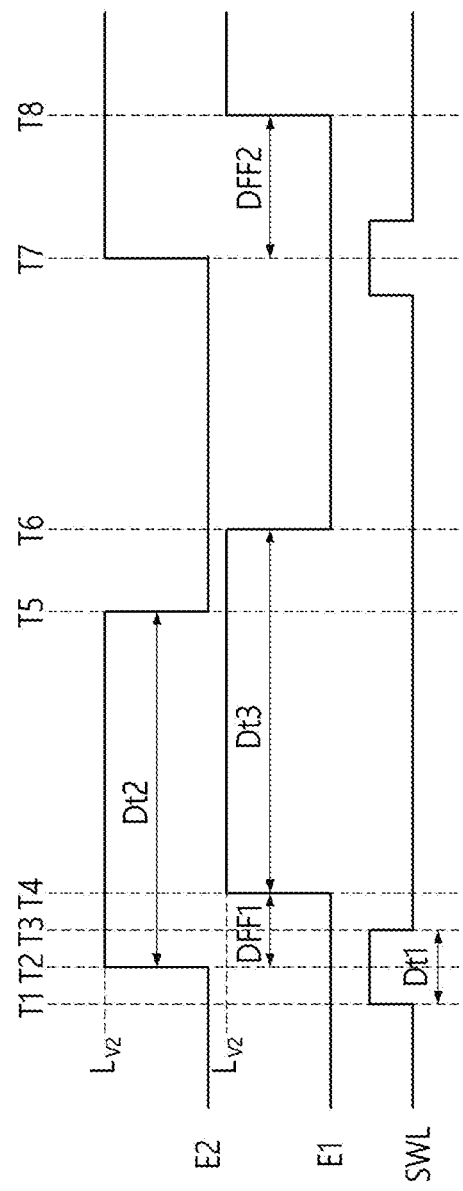
FIG. 10 is a diagram referenced in the description of FIG. 9.

FIG. 9 is a block diagram of a camera module according to an embodiment, and FIG. 10 is a block diagram referenced in the description of FIG. 9.

First, a term "unit" used herein includes a software, a field-programmable gate array (FPGA), or a hardware component such as an application-specific integrated circuit (ASIC), and the "unit" performs certain functions. However, the "unit" is not limited to the software or hardware. The "unit" may be configured to reside on an addressable storage medium or may be configured to play back one or more processors. Therefore, the "unit" may include, for example, components (such as software components, object-oriented software components, class components, and task components), processes, functions, attributes, procedures, subroutines, segments of program code, drivers, firmware, microcodes, circuitry, data, databases, data structures, tables, arrays, and variables. Components and functions provided in "units" may be combined to be a smaller number of components and "units," or may be further divided into additional components and "units." Furthermore, the components and "units" may be implemented to play back one or more central processing units (CPUs) in a device or a secure multimedia card.

Referring to FIG. 9, a camera module 200 may include a control circuit 210, a lens assembly 220, a gyro sensor 230, and a temperature sensor 299. The control circuit 210 may correspond to the aforementioned control circuit 20, and the lens assembly 220 may correspond to the aforementioned lens assembly 10, i.e., the lens assembly (110, 120, 130, 140, 162, and 164). In addition, the camera module 200 may further include an image sensor 30 and an image processor 31.

In addition, the control circuit 210 of the camera module 200 may further include an equalizer 270, a sensor unit 291, a converter 292, a compensation unit 293, and a memory 290. However, it should be understood that positions of the sensor unit 291, the converter 292, and the compensation unit 293 are not limited to such positions, and the sensor unit 291, the converter 292, and the compensation unit 293 may be provided at any position in the camera module.

First, the gyro sensor 230 may detect an angular velocity of a liquid lens 280 or the camera module and may also be positioned in a controller 240. That is, the position of the gyro sensor is not limited to such a position. In addition, the gyro sensor 230 may detect an angular velocity (or an angle) of movement in two directions, for example, a yaw-axis direction and a pitch-axis direction, in order to compensate for hand shake of the optical device in an up-down direction and a left-right direction. The gyro sensor 230 may generate a motion signal having information on the detected angular velocity and provide the motion signal to the voltage controller 240.

In addition, the image sensor 30 may convert light passing through the liquid lens 280 into an electrical signal. Further, the image processor 31 may perform image processing on the basis of the electrical signal from the image sensor 30. It should be understood that the image processor 31 may be positioned in the control circuit 210 or the camera module according to the embodiment or an external system (e.g., a terminal).

An external system 40 may be positioned outside the camera module. For example, the external system 40 may be a terminal and may provide the electrical signal to the camera module so that an interface of the liquid lens 280 in the camera module has a desired diopter (or curvature or focal length). It should be understood that the diopter of the liquid lens as used herein is a term corresponding to the "curvature" at the interface of the liquid lens or "focal length" of the liquid lens, and descriptions are provided based on this. In an embodiment, the external system 40 (or the image processor) may provide an electrical signal for setting a focus through the image processor 31 to the camera module (e.g., the control circuit 210). The external system 40 may transmit a driving voltage code, which is a digital code, to the controller 240. As described above, the external system 40 may be positioned outside the camera module. For example, the external system 40 may be positioned on the terminal and may further include a control unit, a controller, and the like. In addition, the external system 40 may be connected to the camera module by an inter-integrated circuit (I2C) communication method. However, the present invention is not limited thereto, and the connection may be made by other communication methods other than the I2C communication method.

The temperature sensor 299 may detect a temperature of the liquid lens 280 or a temperature of a liquid in the liquid lens 280. However, the present invention is not limited thereto, and the temperature of the liquid lens 280 or the lens assembly 220 may be detected.

The temperature sensor 299 may include a thermistor or the like. For example, the temperature sensor 299 may include a negative temperature coefficient (NTC) type of thermistor that is inversely proportional to the detected temperature or a positive temperature coefficient (PTC) type of thermistor that is proportional to the detected temperature.

Further, the temperature sensor 299 may transmit temperature information including the detected temperature to the control circuit 210 or the compensation unit 293. In the present specification, the temperature sensor 299 provides the temperature information to the compensation unit 293. In addition, when it is determined that the temperature increases through the temperature information received from the temperature sensor 299, the compensation unit 293 may provide feedback information to the controller 240 in consideration of a change in the interface of the liquid lens 280 according to the temperature, and the controller 240 may output a driving signal adjusted according to the feedback information. The detailed description thereof will be given below. In addition, the temperature information refers to a temperature, and the temperature information and the temperature are used interchangeably in the description below. In addition, the driving signal is a voltage code in a digital form corresponding to the driving voltage code, and thus, will be used interchangeably with the driving voltage code.

The control circuit 210 may include the controller 240, a lens driving unit 250, and a power supply unit 260, and may control the operation of the lens assembly 220 including the liquid lens 280.

The controller 240 may have a configuration for performing an auto focus (AF) function and an optical image stabilization (OIS) function. The controller 240 may control the liquid lens 280 included in the lens assembly 220 using a user request or a detected result (e.g., a detection signal of the gyro sensor 230). Here, the liquid lens 280 may correspond to the liquid lens unit described above.

The controller 240 may calculate a driving voltage corresponding to a desired shape of the liquid lens 280. Specifically, the controller 240 may receive information (i.e., information on a distance to an object) for the AF function from an optical device, or the internal component of the camera module 200 (e.g., the image sensor 30) or the external component (e.g., a distance sensor or an application processor), and may calculate the driving voltage corresponding to the desired shape of the liquid lens 280 on the basis of a focal length, which is for focusing on the object, through the distance information.

In addition, the controller 240 may obtain the driving voltage code corresponding to the driving signal through a predetermined table. Accordingly, the driving voltage code and the driving signal are described interchangeably in the present specification. In addition, the controller 240 may obtain a driving voltage corresponding to the driving voltage code by referring to a driving voltage table and output the obtained driving voltage to the lens assembly 220 (e.g., a driving voltage providing unit (not shown)). Alternatively, the controller 240 may further include a driving voltage unit (not shown) configured to generate the driving voltage, and the driving voltage unit may be positioned in a liquid lens module or in the camera module.

Alternatively, the controller 240 may generate an analog-type driving voltage corresponding to the driving voltage code through the lens driving unit 250 on the basis of the obtained digital-type driving voltage code, and may provide the analog-type driving voltage to the lens assembly 220.

In an embodiment, the controller 240 may output the driving voltage code, which is a voltage code in a data form (e.g., digital), and may apply the driving signal in an analog form to the liquid lens 280 through pulse-width modulation (PWM) control. Accordingly, finally, the controller 240 may control the curvature or diopter of the liquid lens 280.

The lens driving unit 250 may selectively provide a voltage level supplied from the power supply unit 260, which will be described below, to each terminal of the liquid lens 280. In an embodiment, the lens driving unit 250 may include a switching unit. Here, the switching unit may include a circuit component called an H-bridge.

In addition, a high voltage output from a voltage booster may be applied as a power supply voltage of the switching unit. Accordingly, the switching unit may selectively supply the applied power supply voltage and a ground voltage to both ends of the liquid lens 280.

Further, as described above, the liquid lens 280 includes four first electrodes including four electrode sectors for driving, a first connection substrate, one second electrode, and a second connection substrate. Both ends of the liquid lens 280 may be any one of the plurality of first electrodes and the second electrode. In addition, both ends of the liquid lens 280 may be one of the four electrode sectors of the four first electrodes and one electrode sector of the second electrode.

Accordingly, a pulse-type voltage having a predetermined width may be applied to each electrode sector of the liquid lens 280. In addition, the voltage may be a difference between voltages applied to the first and second electrodes and may be applied to the liquid lens 280.

The power supply unit 260 may apply a separate power to the lens driving unit 250. The power supply unit 260 may include the voltage booster that increases a voltage level. In addition, the aforementioned lens driving unit 250 may selectively output the increased voltage to each terminal of the liquid lens 280.

As described above, the controller 240 may control a phase of the driving signal supplied to the lens driving unit 250, that is, a phase of a pulse voltage applied to the common electrode and the individual electrode so that the lens driving unit 250 may generate an analog-type driving voltage corresponding thereto. In other words, the controller 240 may control a voltage applied to each of the first electrode and the second electrode. Hereinafter, a description will be made on the basis of a driving signal in the form of voltage.

Further, the control circuit 210 may further include a connector (not shown) that performs a communication or interface function of the control circuit 210. For example, the connector may perform communication protocol conversion for communication between the control circuit 210, which uses an I2C communication method, and the lens assembly 220, which uses a mobile industry processor interface (MIPI) communication method. In addition, the connector may receive power from an external device (e.g., a battery) and supply power required for the operation of each of the controller 240 and the lens assembly 220. In this case, the connector may correspond to the connector 153 shown in FIG. 2.

In addition, when a calculated curvature is greater than a target curvature, the equalizer 270 may control a duty of a pulse width to be increased or control a delay, which is a time difference between a plurality of pulses applied to the liquid lens 280, to be increased on the basis of a calculated curvature error 1. Accordingly, the camera module may quickly and accurately change the curvature of the liquid lens 280.

The equalizer 270 may receive focus information AF from the image processor 31 and shake information OIS from the gyro sensor 230, and determine the target curvature on the basis of the focus information AF and the inclination information (or shake information) OIS.

Here, an update cycle of the determined target curvature may be longer than an update cycle of the calculated curvature on the basis of the detected capacitance of the liquid lens 280. However, the present invention is not limited thereto.

In addition, since the update cycle of the calculated curvature is shorter than the update cycle of the target curvature, the curvature of the liquid lens 280 may be quickly varied to be changed to a desired curvature. For example, the control circuit 210 may perform a curvature change or the like by changing the curvature to the desired curvature due to the temperature or the like within the update cycle of the target curvature and then updating the target curvature again.

The memory 290 may be positioned separately from the control circuit 210. The memory 290 may store temperature information for each diopter, delay information, information on a delay that is a time difference between a plurality of pulses (voltage signals) applied to the liquid lens 280, gain information, and offset information. For example, the memory 290 may store temperature information for a diopter (e.g., a 0 diopter), delay information, information on a delay that is a time difference between a plurality of pulses (voltage signals) applied to the liquid lens 280, gain information, and offset information.

In an embodiment, the control circuit 210 may quickly and accurately vary the curvature of the lens using the detected temperature information by varying a delay, which is a time difference of a plurality of pulses applied to the liquid lens 280, according to the detected temperature. As a result, the camera module may accurately provide the target curvature.

Further, the control circuit 210 may output a compensation signal for compensating for an offset of the signal sensed by the sensor unit 291 according to the detected temperature, thereby accurately detecting the curvature of the lens.

Further, the converter 292 may convert a signal related to the capacitance sensed by the sensor unit 291 into a digital signal. In other words, the converter 292 may output the digital signal as interface information representing the interface of the liquid lens as described above. In addition, the interface information may correspond to the curvature of the interface in the liquid lens. In an embodiment, the converter may convert the digital signal to correspond to the driving signal that is a voltage code in a data form (e.g., digital).

In addition, the camera module 200 may further include conductive lines CA1 and CA2 and a switching element SWL. First, the plurality of conductive lines CA1 and CA2 may supply an electrical signal from the lens driving unit 250 to each of the electrodes (the common electrode and the plurality of electrodes) in the liquid lens 280. In addition, the switching element SWL may be disposed between one (e.g., CA2) of the plurality of conductive lines and the sensor unit 291.

In the present specification, when referring to the drawings, by way of example, the conductive line CA2 may apply an electrical signal to any one of the plurality of electrodes in the liquid lens 280, and the switching element SWL may be disposed between the conductive line CA2 and the sensor unit 291. In this case, a contact point between the conductive line CA2 and one end of the switching element SWL or the liquid lens 280 may be referred to as a node A.

Meanwhile, in the present invention, an electrical signal may be applied to each of the electrodes (the common electrode and the plurality of electrodes) in the liquid lens 280 through the plurality of conductive lines CA1 and CA2 to detect the curvature of the liquid lens 280. Accordingly, a curvature can be formed in the liquid in the liquid lens as described above.

For example, the switching element SWL may be turned on during a first period. At this point, when an electrical signal is applied to the electrodes in the liquid lens 280 in a state in which the switching element SWL is turned on and is thus electrically connected to the sensor unit 291, a curvature may be formed in the liquid lens 280. In addition, an electrical signal corresponding to the formed curvature may be supplied to the sensor unit 291 via the switching element SWL.

Accordingly, the sensor unit 291 may detect a size of an area or a change in the area of a boundary region in the liquid lens 280 of the liquid lens 280 on the basis of the electrical signal from the liquid lens 280 during the ON period of the switching element SWL. In an embodiment, the sensor unit 291 may detect a capacitance of the boundary region. In addition, the converter 292 may output interface information corresponding to the curvature of the interface of the liquid lens at this point.

In addition, during a second period after the first period, the switching element SWL may be turned off, and the electrical signal may be continuously applied to the electrodes in the liquid lens 280. Accordingly, a curvature may be formed in the boundary region in the liquid lens.

In addition, during a third period after the second period, the switching element SWL may be turned off, and no electrical signal or a low-level electrical signal may be applied to the electrodes in the liquid lens 280.

In addition, during a fourth period after the third period, the switching element SWL may be turned on. At this point, the switching element SWL may be turned on and thus in a state of being electrically connected to the sensor unit 291. In addition, when an electrical signal is applied to the electrodes in the liquid lens 280, a curvature may be formed in the liquid lens 280, and an electrical signal corresponding to the formed curvature may be supplied to the sensor unit 291 via the switching element SWL.

Meanwhile, when the curvature calculated on the basis of the capacitance detected during the first period is less than the target curvature, the control circuit 210 may control a pulse width of the driving signal supplied to the lens driving unit 250 to be increased so that the curvature reaches the target curvature.

Thus, the time difference between the pulses applied to the plurality of individual electrodes E1 and the common electrode E2 may be increased, and accordingly, the curvature formed in the boundary region may be changed.

In addition, since the sensor unit 291 detects the curvature of the boundary region, the camera module may quickly and accurately identify the curvature of the liquid lens 280.

Further, the interface information corresponding to the interface of the liquid lens may correspond to the driving voltage code that is a driving signal (e.g., a digital signal) for adjusting the interface of the liquid lens 280. The detailed description thereof will be given below.

In addition, in the present embodiment, a target diopter (or target curvature) is a driving voltage code corresponding to a driving voltage provided to the liquid lens 280 (when bypassed) from the external system 40, which includes a controller, or a control device in the mobile terminal when the interface of the liquid lens 280 is deformed to the desired diopter regardless of temperature. Accordingly, the liquid lens 280 may be in a state of not having a desired diopter, to which the deformation of the interface of the liquid according to the temperature is reflected, even when the interface is adjusted due to the driving voltage code corresponding to the target curvature.

The compensation unit 293 according to the embodiment may compensate for the deformation of the interface of the liquid according to the temperature, which is described above, so that the liquid lens provides the target diopter.

The compensation unit 293 may recognize the target diopter from the driving signal or the driving voltage code received from the external system 40 or the image processor. In addition, the compensation unit 293 may output feedback information using the interface information and the temperature information so that the curvature of the liquid lens has the target diopter. Accordingly, the controller outputs the compensated driving voltage code, and the interface of the liquid lens 280 may be re-adjusted to have the target diopter. Accordingly, even when a temperature change occurs, the liquid lens 280 may provide a diopter (hereinafter interchangeably used with the "target curvature" or "target diopter") desired in the external system 40.

First, the compensation unit 293 may receive interface information corresponding to the interface of the liquid lens 280. In an embodiment, the compensation unit 293 may receive the interface information from the sensor unit 291.

The compensation unit 293 may receive the interface information, that is, a digital signal corresponding to the curvature of the interface of the liquid lens from the sensor unit 291 and the converter 292.

The compensation unit 293 may also receive temperature information of the liquid lens. That is, the compensation unit 293 may be connected to the temperature sensor 299 and may receive the temperature information of the liquid lens 280 from the temperature sensor 299.

Further, the compensation unit 293 may include a data unit. The data unit may be positioned in the camera module, for example, positioned in the memory 290 described above.

The data unit may store a plurality of first driving signals for each temperature for a first diopter of the liquid lens 280 in a first region, and a plurality of second driving signals for each temperature for a second diopter of the liquid lens 280 in the first region. In addition, the diopter of the liquid lens below, such as the first and second diopters, may correspond to the curvature or a focal length of the liquid lens, and may be data for the liquid lens previously stored in the data unit.

In addition, the data unit may store a plurality of third driving signals for each temperature for the first diopter of the liquid lens 280 in a second region, and a plurality of fourth driving signals for each temperature for the second diopter of the liquid lens 280 in the second region. In this case, the first diopter and the second diopter may be different. In addition, each of the first diopter and the second diopter indicates the curvature of the interface of the liquid lens. Here, the feedback information may include information on a diopter of the liquid lens according to a driving signal composed of a point that has an inflection point at a specific curvature. In addition, a characteristic graph of the diopter of the liquid lens may be divided into the first region and the second region on the basis of the point having an inflection point. The diopter or curvature in the first region may be greater than that in the second region. In addition, the feedback information may be an added driving voltage code or driving voltage code.

Further, the data unit may store at least two driving signals for two or more temperatures at the same diopter.

For example, the data unit may store a driving signal (e.g., a first driving signal) at 25° or 50° for 50 diopters and a driving signal (e.g., a second driving signal) at 30° or 40° for 40 diopters.

Further, when the diopter of the point having an inflection point is 30 diopters, the data unit may store a driving signal (e.g., the third driving signal) at 25° or 50° for 20 diopters and a driving signal (e.g., the fourth driving signal) at 30° or 40° for 10 diopters. In the present specification, the point having an inflection point will be described below as an inflection point composed of a driving signal and a diopter.

In addition, the compensation unit 293 may calculate the feedback information corresponding to the temperature information and the target diopter using at least one of first, first, third, and fourth driving signals of the data unit. The feedback information may be the driving voltage code provided to the controller as described above, and the driving voltage code may correspond to the driving signal, and thus the following description will be made on the basis that the feedback information is the driving signal. In other words, the compensation unit 293 may calculate the feedback information (hereinafter, interchangeably used with a feedback driving signal) that is used for re-adjusting the interface of the liquid lens 280 by compensating for the temperature. As a result, when the driving voltage is applied to the interface due to the feedback driving signal, the liquid lens 280 may have the diopter desired in the external system 40.

For example, a driving signal causing the interface of the liquid lens to form 8 diopters at 10° C. and a driving signal causing the interface of the liquid lens to form 8 diopters at 30° C. may be different from each other. Accordingly, in the embodiment, the feedback driving signal may be output through the compensation unit 293 as the driving signal, which is different according to the temperature, so that the interface has the desired diopter.

Further, in an embodiment, the compensation unit 293 may calculate a first-first driving function for the plurality of first driving signals and a second-first driving function for the plurality of second driving signals. In addition, the compensation unit 293 may calculate a first-second driving function for the plurality of third driving signals and a second-second driving function for the plurality of fourth driving signals.

In each of the first-first driving function and the second-first driving function, the curvature may be proportional to the temperature, but in each of the first-second driving function and the second-second driving function, the curvature may be inversely proportional to the temperature.

In addition, the compensation unit 293 may calculate each of the first-first driving function and the second-first driving function, or each of the first-second driving function and the second-second driving function on the basis of the driving signal for the same diopter. The first-first and first-second driving functions, and the second-first and the second-second driving functions may be linear functions (i.e., this means that temperature is an independent variable and the driving signal is a dependent variable) of the driving signal (digital code) for the temperature in a specific diopter. The detailed description thereof will be given below. In addition, since the digital code (driving function) according to the temperature and the digital code for the diopter are partially or entirely linear in the liquid lens, the camera module according to the embodiment may improve the accuracy of the diopter by performing compensation for the temperature using such a linear function.

In addition, the compensation unit 293 may calculate a plurality of third-first driving functions for each temperature from the first-first driving function and the second-first driving function. Similarly, the compensation unit 293 may calculate a plurality of third-second driving functions for each temperature from the first-second driving function and the second-second driving function.

In this case, the third-first and third-second driving functions may be linear functions of the driving signal (digital code) for the diopter. In addition, the third-first and third-second driving functions may be calculated for each temperature. That is, the third-first and third-second driving functions may be a plural number, and may be different depending on the temperature. The detailed description thereof will be given below.

Further, the compensation unit 293 may calculate fourth-first and fourth-second driving functions using at least one of the first-first, first-second, second-first, and second-second driving functions and the plurality of third-first and third-second driving functions. The detailed description thereof will be given below.

In addition, the lens driving unit 250, the sensor unit 291, the control circuit 210, the power supply unit 260, the converter 292, the compensation unit 293, and the switching element SWL may be implemented by a single chip as a system on chip (SOC). However, the present invention is not limited thereto.

Referring to FIG. 10, a timing diagram for the common electrode E2, the individual electrode E1, and the switching element SWL in the camera module is illustrated.

Specifically, during a period Dt1 between a time point T1 and a time point T3, the switching element SWL is turned on. In this case, in order to detect the capacitance of the boundary region through the sensor unit 291, a curvature may be preferably formed in the liquid lens 280 during the period Dt1 between the time point T1 and the time point T3.

In addition, it is illustrated that, for the accuracy and stability of detecting in the sensor unit 291, in the present invention, a pulse is applied to one of the plurality of individual electrodes E1 and the common electrode E2 in the liquid lens 280 during the period Dt1 between the time point T1 and the time point T3.

In an embodiment, a pulse having a pulse width of Dt2 may be applied to the common electrode E2 at a time point T2. Accordingly, a curvature may be formed in the liquid lens 280 after the time point T2.

In addition, as described above, the sensor unit 291 may detect capacitances corresponding to the size of the area or the change in the area of the boundary region during a period between the time point T2 and the time point T3 in the period Dt1 between the time point T1 and the time point T3. Alternatively, during the period between the time point T2 and the time point T3, the sensor unit 291 may detect a potential difference or a current between the first liquid and the electrodes corresponding to the size of the area or the change in the area of the boundary region in the liquid lens 280.

In addition, a pulse having a pulse width of Dt3 may be applied to the individual electrode E1 at a time point T4. That is, a high-level voltage may be applied to the common electrode E2 at the time point T2, and a high-level voltage may be applied to the individual electrode E1 at the time point T4.

Accordingly, the curvature in the liquid lens 280 may be varied due to a time difference DFF1 between the pulse applied to the common electrode E2 and the pulse applied to the individual electrode E1.

For example, as the time difference Dff1 between the pulses increases, the area of the boundary region may increase. In other words, the capacitance may be increased and the curvature may be increased.

In addition, it is possible to maintain or change the curvature in the liquid lens 280 by varying a time difference DFF2 between the pulses after the time difference DFF1 between the pulses.

Further, it should be understood that the control of performing compensation according to the temperature as will be described below in the camera module according to the embodiment may be performed simultaneously or separately from the compensation of the target curvature described above. For example, the function of the controller, which will be described below, may be achieved independent of the compensation, which is performed to obtain the target curvature, as in FIG. 9.

Figure 11:
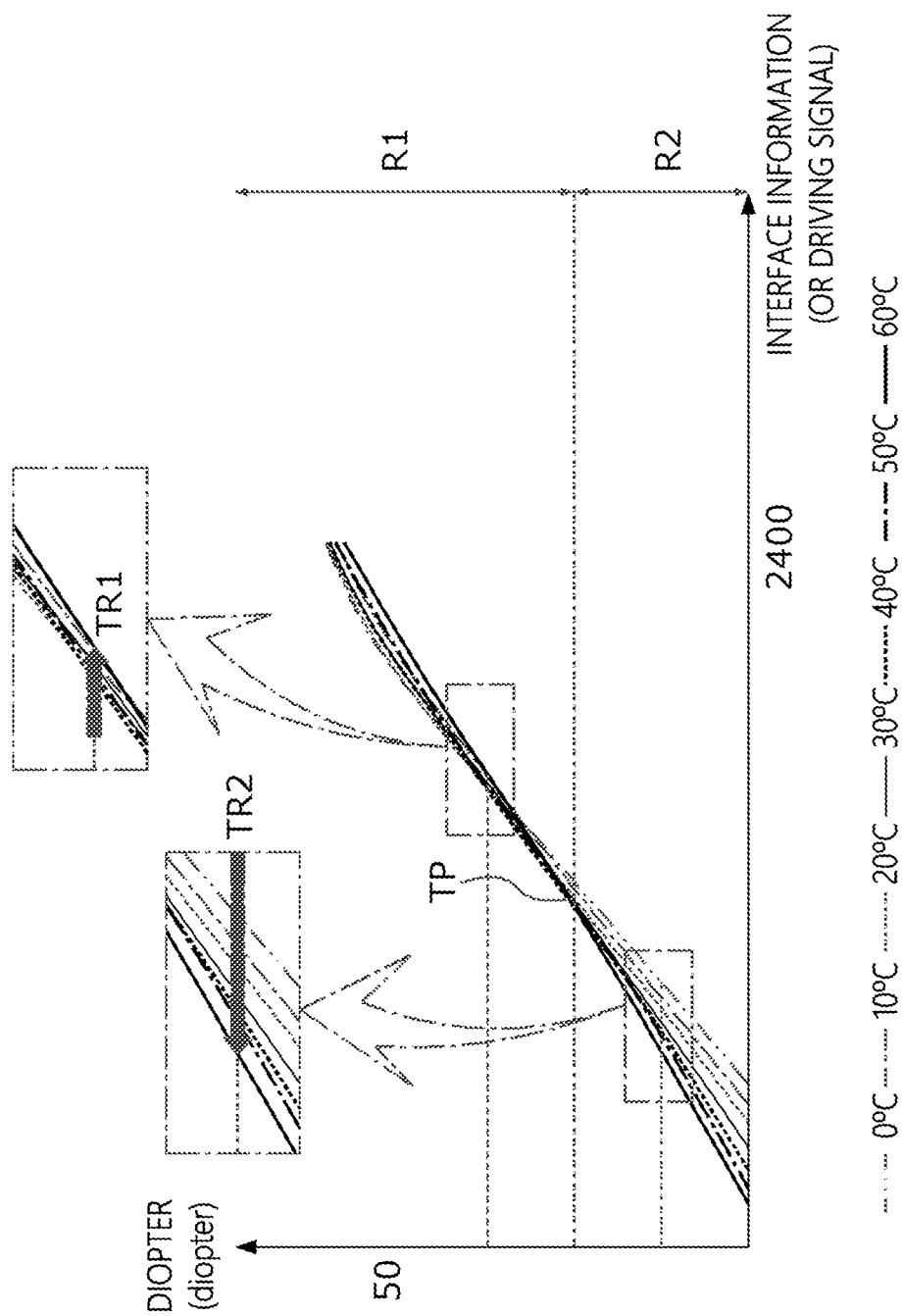
FIG. 11 is a diagram illustrating a diopter according to a driving signal for each temperature of a liquid lens.
Figure 12:
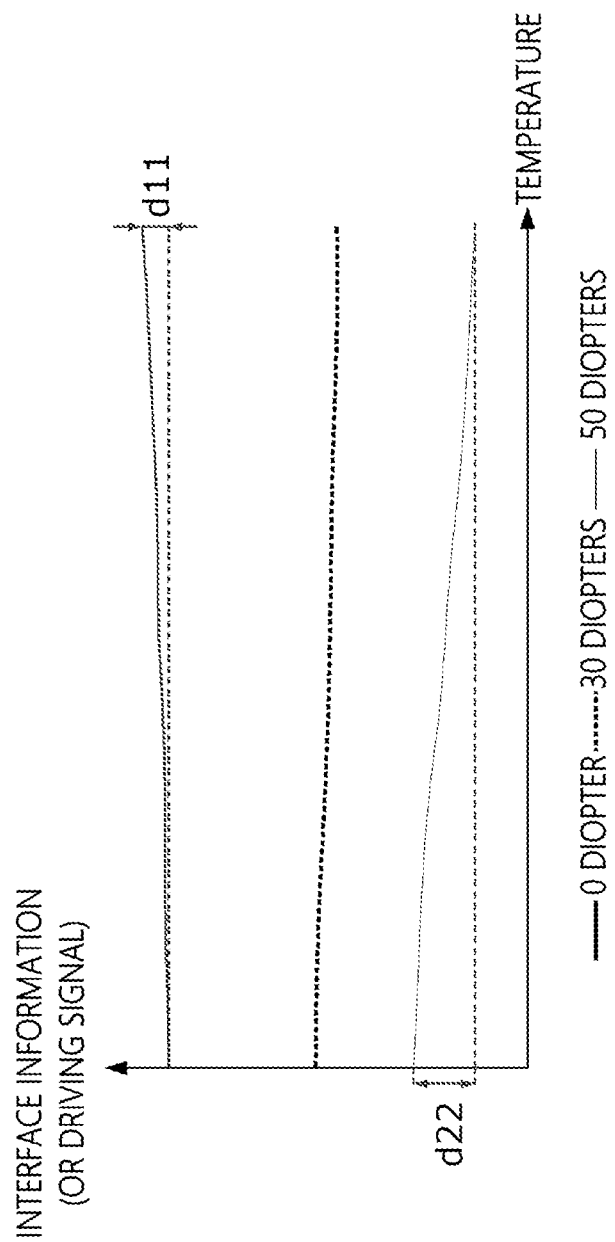
FIG. 12 is a diagram illustrating a change in the driving signal according to a temperature for each diopter of the liquid lens.

FIG. 11 is a diagram illustrating a diopter according to the driving signal for each temperature of the liquid lens, FIG. 12 is a diagram illustrating a change in the driving signal according to the temperature for each diopter of the liquid lens, FIG. 13A is a view for describing a change in focus when the temperature increases in the first region, FIG. 13B is a view for describing a change in focus when the temperature increases in the second region.

Referring to FIG. 11, a change in diopter according to the interface information (or driving signal) is illustrated for each temperature. Since the feedback information is a value corresponding to a difference in the interface information (or the driving signal), the feedback information may have a point having an inflection point TP or an inflection point similar to the change in the diopter according to the interface information. Here, the inflection point may be a point at which a trend of the diopter according to the interface information (or the driving signal) is changed. In other words, the inflection point may be a point at which the increase or decrease of an inclination changes and may be a point at which an inclination of the function of the diopter according to the interface information (or the driving signal) increases and then decreases or decreases and then increases.

In an embodiment, the feedback information may be divided into a first region R1 and a second region R2 on the basis of the point (or the inflection point) having an inflection point. In the first region R1, the interface information (or the driving signal) for the same diopter (e.g., 40 diopters) may increase as the temperature increases, but in the second region R2, the interface information (or the driving signal) for the same diopter (e.g., 20 diopters) may decrease as the temperature increases.

That is, the amount of change of the interface information (or the driving signal) according to the temperature may be different based on the diopter of the inflection point. For example, the amount of change of the interface information (or the driving signal) according to the temperature may be reversed based on the diopter of the inflection point. Accordingly, the camera module according to the embodiment may provide the user with the desired curvature by compensating for the temperature change through the first and second driving signals in the first region R1 and through the third and fourth driving signals in the second region R2 based on the inflection point.

Hereinafter, it should be understood that the interface information is a digital signal received from the converter (see FIG. 9) and mapped to the curvature (or the diopter) in a different manner from the driving signal (or the driving voltage code), but operates in response to the curvature so that interface information may be applied in the same manner as the driving signal (or the driving voltage code).

Referring to FIG. 12, when the diopter has a high value (e.g., in the first region), the interface information (or the driving signal) may increase as the temperature increases (d11). In contrast, when the diopter has a low value (e.g., in the second region), the interface information (or the driving signal) may decrease as the temperature increases (d12). As described above, in the liquid lens according to the embodiment, the increase or decrease of the interface information (or the driving signal) may be different according to the temperature change on the basis of the inflection point.

Referring to FIG. 13A, when the temperature increases in the first region, and the interface information (or the driving signal) may further increase than the target diopter. Accordingly, a focus of light passing through a liquid lens 140 (to which the content of the liquid lens unit is equally applied) may be positioned in front of the image sensor (between the image sensor and the liquid lens). In this case, the camera module according to the embodiment may adjust the focus through the feedback information that causes the interface information (or the driving signal) to decrease.

Referring to FIG. 13B, when the temperature increases in the second region, the interface information (or the driving signal) may further decrease than the target diopter. Accordingly, the focus of the light passing through the liquid lens 140 may be positioned in the rear of the image sensor. In this case, the camera module according to the embodiment may adjust the focus through the feedback information that causes the interface information (or driving signal) to increase.

FIGS. 14 to 18 are diagrams for describing a relationship between the temperature, the diopter, and the driving signal in order to describe an operation of the controller according to the embodiment in the first region.

Figure 14:
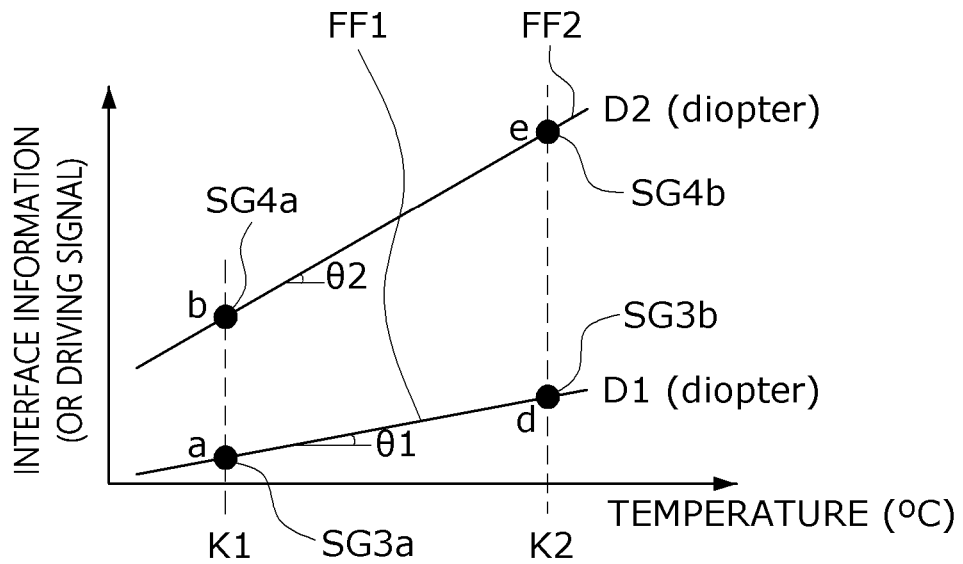
FIGS. 14 to 18 are diagrams for describing a relationship between the temperature, the diopter, and the driving signal in order to describe an operation of a controller according to the embodiment in the first region.
Figure 15:
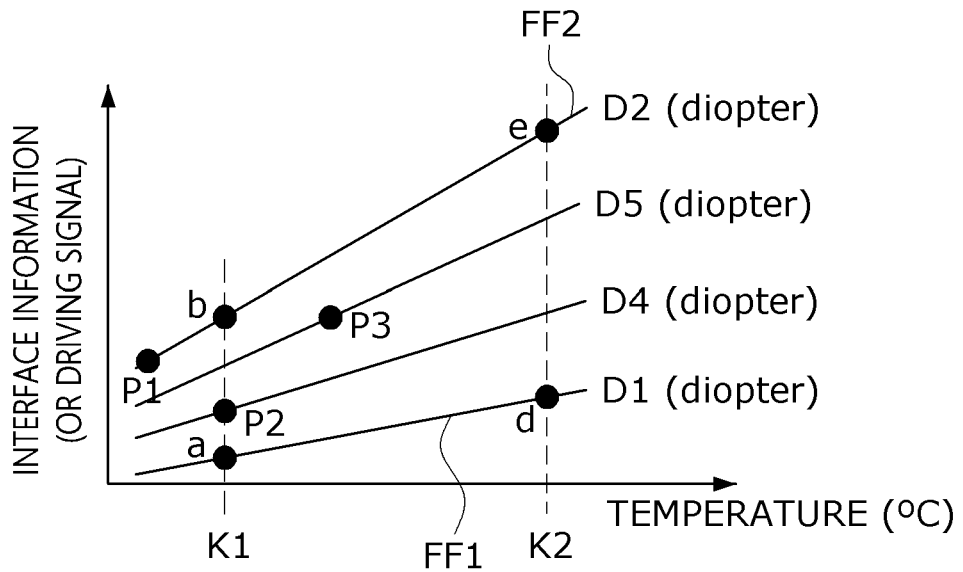

Referring to FIG. 14, the compensation unit according to the embodiment may generate a first-first driving function FF1 and a second-first driving function FF2 from a plurality of first driving signals SG3a and SG3b and a plurality of second driving signals SG4a and SG4b of the data unit. In addition, in the following description, "a," "b," "d," "e," "x," "y," "h," "i," "f," and "g" may be pieces of interface information (or driving signals or digital codes of the driving signals).

Specifically, the first driving signals SG3a and SG3b are pieces of interface information (or driving signals) at different temperatures K1 and K2 for a first diopter D1, and the first-first driving function FF1 is a linear function of the interface information (or driving signal) for the temperature in the first diopter D1.

In addition, the second driving signals SG4a and SG4b are pieces of interface information (or driving signals) at different temperatures K1 and K2 for a second diopter D2, and the second-first driving function FF2 is a linear function of the interface information (or driving signals) for the temperature in the second diopter D2. In this case, the temperature corresponding to the first driving signals SG3a and SG3b and the temperature corresponding to the second driving signals SG4a and SG4b may be different, or at least some thereof may be the same.

Further, an inclination θ1 of the first-first driving function FF1 may be less than an inclination θ2 of the second-first driving function FF2. In other words, as the diopter increases in the first region, the inclination of the driving function may increase.

Figure 16:
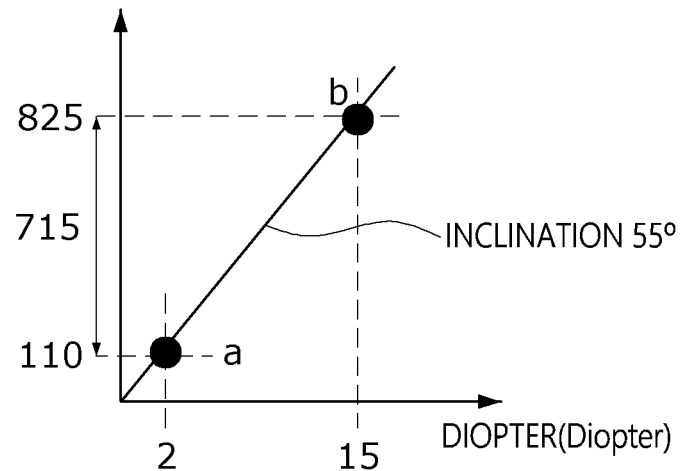

Referring to FIGS. 14 and 16, the compensation unit may calculate a first feedback driving signal P1, which is feedback information, using the first-first driving function or the second-first driving function FF2. As an example, when the target diopter is the second diopter D2, the first feedback driving signal P1 may be positioned on the second-first driving function FF2. In addition, the second-first driving function FF2 may be calculated as a linear function (e.g., a linear function) for the second driving signals SG4a and SG4b, as described above. In this case, the compensation unit may calculate the driving signal corresponding to the temperature detected by the temperature sensor as the first feedback driving signal P1 (referring to FIG. 14, the value less than K1). Accordingly, in the liquid lens, the interface may operate with the second diopter D2, which is the target curvature.

In addition, even when a y-axis is the interface information, the above-described contents may be equally applied. For example, when the diopter (current diopter) corresponding to the temperature information and the interface information is the first diopter and the target diopter is the second diopter D2, the first feedback driving signal P1 may be proportional to or inversely proportional to a diopter difference (target diopter-current diopter) between the current diopter corresponding to the interface information at the detected temperature and the target diopter. However, in the present specification, it is described that the first feedback driving signal P1 is proportional to the diopter difference, and the first feedback driving signal has a predetermined multiple of the difference between the target diopter and the current diopter, but this may be changed according to a request of the external system. For example, when the current diopter and the target diopter are the same, the liquid lens is in a state of providing accurate focus through the interface. In addition, when the interface information is not positioned on the first-first and first-second driving functions or the second-first and second-second driving functions at a predetermined temperature, the interface information may be derived through third-first and third-second driving functions or fourth-first and fourth-second driving functions, which will be described below.

Furthermore, in FIG. 16, the target diopter may be 2, and the current diopter according to the detected temperature and interface information may be 15 (a proportional coefficient is 55). Accordingly, the first feedback driving signal P1 may be −715. In this case, when a driving voltage code applied to the external system is reduced by as much as 715, the liquid lens may provide 2 diopters, which is the desired target curvature.

In contrast, the target diopter may be 15 diopters, and the diopter according to the target interface information at the detected temperature may be 2 diopters (the proportional coefficient is 55). The first feedback driving signal P1 may be 715. In addition, the driving voltage code is reduced by as much as 715 and applied to the controller. Accordingly, the liquid lens may provide 15 diopters, which is the target curvature required in the external system. Accordingly, hereinafter, a description will be made on the basis of the driving signal for convenience of description. That is, when the y-axis is the driving signal, the above-described proportional coefficient may not be applied.

Figure 17:
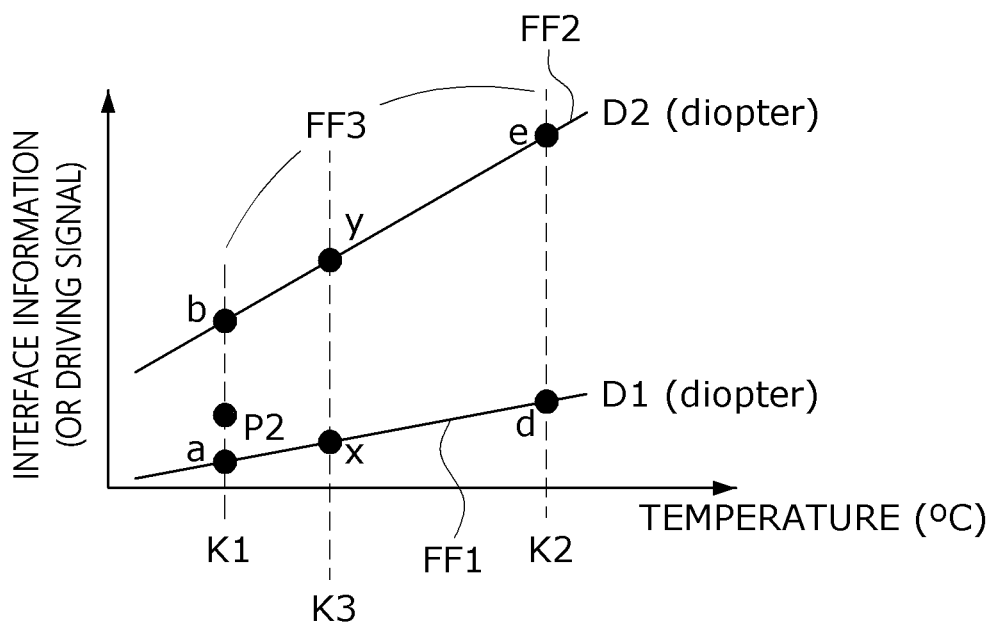

Referring to FIG. 17, the compensation unit may calculate a plurality of third-first driving functions FF3 for each temperature from the first-first driving function FF1 and the second-first driving function FF2.

In an embodiment, when the first driving signals SG3$a$ and SG3$b$ and the second driving signals SG4$a$ and SG4$b$ are driving signals for the same temperature as shown in FIG. 14, the compensation unit may calculate the third-first driving function using the first driving signal and the second driving signal.

That is, the compensation unit may calculate the third-first driving function using driving signals a and b of the first driving function and the diopters D1 and D2, and driving signals d and e of the second driving function and the diopters D1 and D2. For example, the compensation unit may calculate the third-first driving function FF3 as the linear function of the driving signal for the diopter at a temperature K1 using the driving signals a and b of the first driving signal and the diopters (the first diopter D1 and the second diopter D2).

In an embodiment, the compensation unit may calculate a second feedback driving signal P2 using the third-first driving function FF3. As an example, when the second feedback driving signal P2 is positioned on the third-first driving function FF3, the compensation unit may calculate the third-first driving function FF3, to which a difference between the driving signals for each diopter is reflected, from the driving signals a and b. As a result, the driving signal corresponding to the target diopter may be provided as the second feedback driving signal P2. Accordingly, in the liquid lens, the interface may operate with a fourth diopter D4.

More specifically, the third-first driving function FF3 may be calculated using a driving signal y at a specific temperature calculated from the first-first driving function FF1 and a driving signal x at a specific temperature calculated from the second-first driving function FF2.

That is, the compensation unit may calculate the driving signal x for the first diopter D1 at a temperature K3 from the first-first driving function FF1, and calculate the driving signal y for the second diopter D2 at the temperature K3 from the second-first driving function FF2.

Accordingly, the compensation unit may calculate the third-first driving function FF3 as the linear function of the driving signal for the diopter at K3 using the driving signals x and y of the first driving signal and the diopters (the first diopter D1 and the second diopter D2). In this manner, the compensation unit may calculate the plurality of third-first driving functions FF3 for each temperature. In addition, as described above, the plurality of third-first driving functions FF3 may be linear functions of the driving signal for diopters at various temperatures. In addition, the compensation unit may calculate the second driving function by applying the target diopter and the temperature to the third-first driving function.

Figure 18:
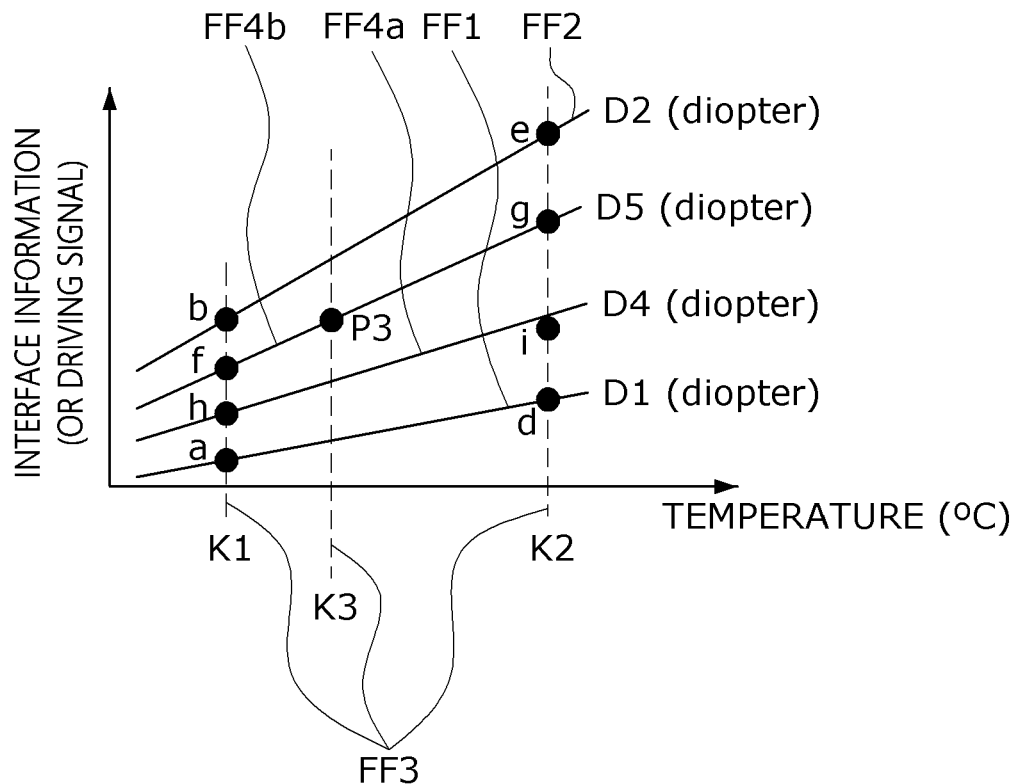

Referring to FIG. 18, the compensation unit may calculate driving functions h, i, f, and g for the fourth diopter D4 and a fifth diopter D5 through the plurality of third-first driving functions FF3. Specifically, the compensation unit may calculate the driving functions h, i, f, and g through the third-first driving function FF3, and calculate fourth-first driving functions FF4$a$ and FF4$b$, which are linear signals of the driving signal for the temperature in the same diopters (the fourth diopter D4 or the fifth diopter D5) using the calculated driving functions h, i, f, and g.

Accordingly, the compensation unit may provide the driving signal for a specific diopter at various temperatures as a third feedback driving signal P3 using the driving signals h, f, i, and g of the first driving signal and the diopters (the fourth diopter D4 and the fifth diopter D5). For example, in a case in which the target diopter is the fourth diopter D4 or the fifth diopter D5, the compensation unit may calculate the third feedback driving signal P3 using the fourth-first driving functions FF4$a$ and FF4$b$.

FIGS. 19 to 22 are diagrams for describing a relationship between the temperature, the diopter, and the driving signal in order to describe an operation of the controller according to the embodiment in the second region.

Figure 19:
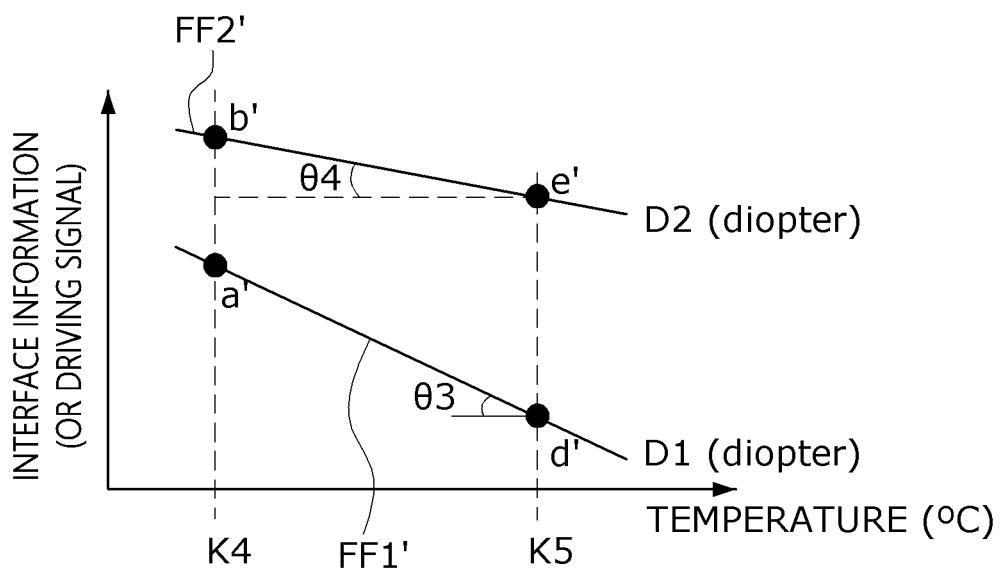

Referring to FIG. 19, the compensation unit 293 according to the embodiment may generate a first-second driving function FF1' and a second-second driving function FF2' from the third driving signal and the fourth driving signal of the data unit. In addition, in the following description, "a," "b," "d," "e," "x," "y," "h," "i," "f," and "g'" may be pieces of interface information (or driving signals or digital codes of the driving signals).

Specifically, third driving signals a' and d' are pieces of interface information (or driving signals) at different temperatures K4 and K5 for a first diopter D1, and the first-second driving function FF1' is a linear function of the interface information (or driving signal) for the temperature in the first diopter D1.

In addition, fourth driving signals b' and e' are pieces of interface information (or driving signals) at the different temperatures K4 and K5 for the second diopter D2, and the second-second driving function FF2' is a linear function of the interface information (or driving signals) for the temperature in the second diopter D2. In this case, the temperature corresponding to the third driving signals and the temperature corresponding to the fourth driving signals b' and e' may be different, or at least some of them may be the same.

An inclination θ3 of the first-second driving function FF1' may be greater than an inclination θ4 of the second-second driving function FF2'. In other words, as the diopter increases in the second region, the inclination of the driving function may decrease.

Figure 20:
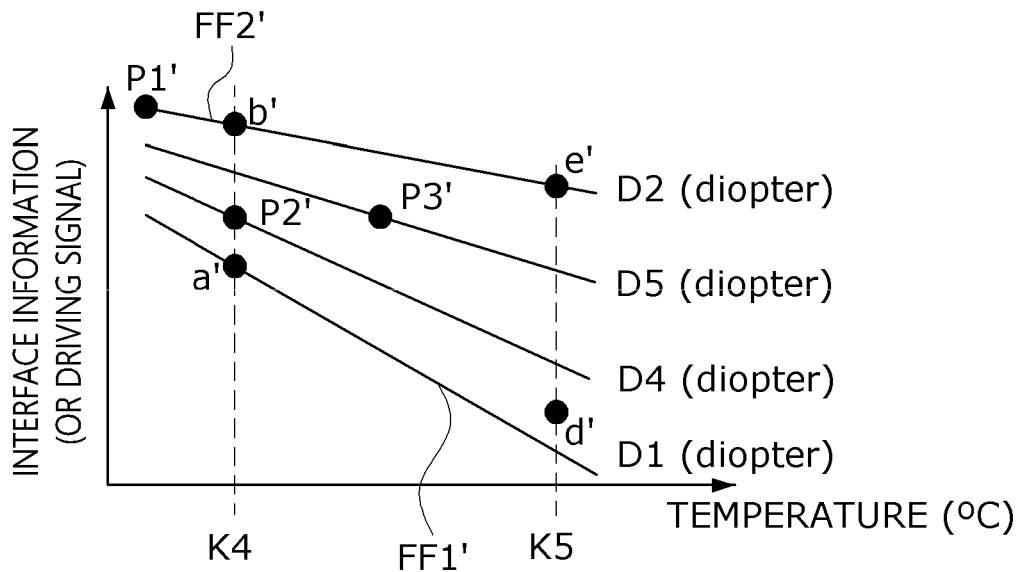

Referring to FIGS. 19 and 20, the compensation unit may calculate a first feedback driving signal P1', which is feedback information, using the first-second driving function FF1' or the second-second driving function FF2'. As an example, when the target diopter is the second diopter D2, the first feedback driving signal P1' may be positioned on the second-second driving function FF2'. In addition, the second-second driving function FF2' may be calculated as a linear function (e.g., a linear function) for the fourth driving signal, as described above. In this case, the compensation unit may calculate the driving signal corresponding to the temperature detected by the temperature sensor as the first feedback driving signal P1' (referring to FIG. 19, the value less than K4). Accordingly, in the liquid lens, the interface may operate with the second diopter D2, which is the target curvature. In addition, even when the y-axis is the interface information, the above-described contents may be equally applied.

Figure 21:
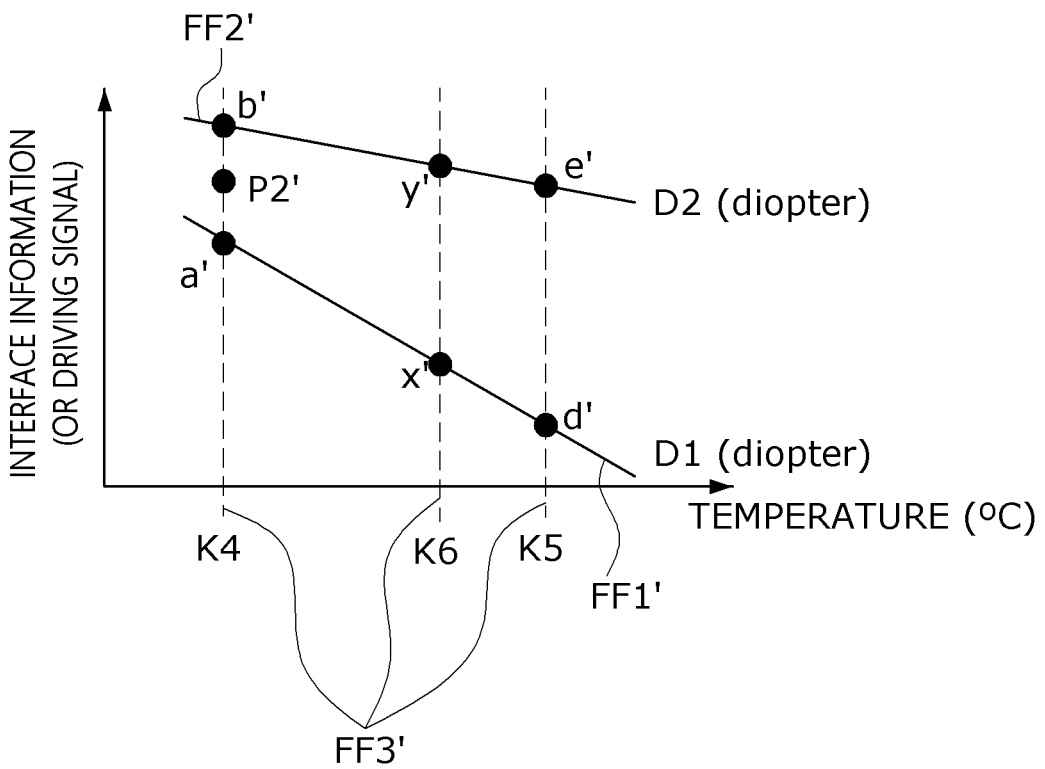

Referring to FIG. 21, the compensation unit may calculate a plurality of third-second driving functions FF3' for each temperature from the first-second driving function FF1' and the second-second driving function FF2'.

In an embodiment, when the third driving signal and the fourth driving signal are driving signals for the same temperature as shown in FIG. 14, the compensation unit may calculate the third-second driving function using the third driving signal and the fourth driving signal.

That is, the compensation unit may calculate the third-second driving function using driving signals a' and b' of the first driving function and the diopter D1 and D2, and driving signals d' and e' of the second driving function and the diopter D1 and D2. For example, the compensation unit may calculate a third-second driving function FF3' as the linear function of the driving signal for the diopter at a temperature K4 using the driving signals a' and b' of the third driving signal and the diopters (the first diopter D1 and the second diopter D2).

In an embodiment, the compensation unit may calculate a second feedback driving signal P2' using the third-second driving function FF3'. As an example, when the second feedback driving signal P2' is positioned on the third-second driving function FF3', the compensation unit may calculate the third-second driving function FF3', to which a difference between the driving signals for each diopter is reflected, from the driving signals a' and b'. As a result, the driving signal corresponding to the target diopter may be provided as the second feedback driving signal P2'. Accordingly, in the liquid lens, the interface may operate with a fourth diopter D4.

More specifically, the third-second driving function FF3' may be calculated using a driving signal y at a specific temperature calculated from the first-second driving function FF1' and a driving signal x at a specific temperature calculated from the second-second driving function FF2'.

That is, the compensation unit may calculate the driving signal x for the first diopter D1 at a temperature K6 from the first-second driving function FF1', and calculate the driving signal y (or a value of the driving function) for the second diopter D2 at the temperature K6 from the second-second driving function FF2'.

Accordingly, the compensation unit may calculate the third-second driving function FF3' as the linear function of the driving signal for the diopter at K6 using the driving signals x and y of the third driving signal and the diopters (the first diopter D1 and the second diopter D2). In this manner, the compensation unit may calculate a plurality of third-second driving functions FF3' for each temperature. In addition, as described above, the plurality of third-second driving functions FF3' may be linear functions of the driving signal for diopters at various temperatures. In addition, the compensation unit may calculate the second driving function by applying the target diopter and the temperature to the third-second driving function.

Referring to FIG. 22, the compensation unit may calculate driving functions h', f, and g' for the fourth diopter D4 and a fifth diopter D5 through the plurality of third-second driving functions FF3'. Specifically, the compensation unit may calculate the driving functions h', f, and g' through the third-second driving function FF3', and calculate fourth-second driving functions FF4a' and FF4b', which are linear signals of the driving signal for the temperature in the same diopters (the fourth diopter D4 or the fifth diopter D5) using the calculated driving functions h', f', and g'.

Accordingly, the compensation unit may provide the driving signal for a specific diopter at various temperatures as a third feedback driving signal P3' using the driving signals h', f, and g' of the third driving signal and the diopters (the fourth diopter D4 and the fifth diopter D5). For example, in a case in which the target diopter is the fourth diopter D4 or the fifth diopter D5, the compensation unit may calculate the third feedback driving signal P3' using the fourth-second driving functions FF4a' and FF4b'. In addition, an inclination of the plurality of fourth-second driving functions may decrease as the diopter increases.

Accordingly, the camera module according to the embodiment may easily perform temperature compensation even when an increase/decrease trend of the interface information or the driving signal changes according to the temperature. In addition, since the camera module performs the temperature compensation for the target diopter using minimum information on the driving signal, the camera module may improve a data processing speed. In particular, since four driving signals are used for a specific diopter, even when the inclination change varies on the basis of the inflection point, the focusing of an image may be easily performed by performing the temperature compensation accurately.

The invention claimed is:
1. A camera module comprising:
a lens assembly including a liquid lens having a first liquid and a second liquid that form an interface;
a temperature sensor configured to detect temperature information of the liquid lens;
a controller configured to adjust the interface by applying a driving signal to the liquid lens;
a signal processing compensation unit configured to output feedback information, in which an inclination of a first diopter of the liquid lens according to the driving signal is proportional to a temperature in a first region and an inclination of a second diopter of the liquid lens according to the driving signal is inversely proportional to a temperature in a second region that is different from the first region, to the controller;

wherein the signal processing compensation unit is configured to calculate a first-first driving function for a plurality of first driving signals, a second-first driving function for a plurality of second driving signals, a first-second driving function for a plurality of third driving signals, and a second-second driving function for a plurality of fourth driving signals, wherein the first diopter and the second diopter are different from each other, wherein the signal processing compensation unit is configured to calculate a plurality of third-first driving functions for each temperature from the first-first driving function and the second-first driving function and calculate the feedback information based on at least one of the first-first driving function, the second-first driving function, and the plurality of third-first driving functions, and wherein the plurality of third-first driving functions are linear functions of the driving signal for the first or second diopter at a specific temperature.

2. The camera module of claim 1, wherein a characteristic graph of the first or second diopter of the liquid lens according to the driving signal is divided into the first region or the second region on the basis of a point having an inflection point.

3. The camera module of claim 2, comprising:
an image sensor configured to receive light passing through the lens assembly,
wherein the signal processing compensation unit outputs the feedback information based on interface information, the temperature information, and a target diopter of the liquid lens.

4. The camera module of claim 1, wherein in each of the first-first driving function and the second-first driving function, a variation of the driving signal according to the temperature is proportional to a curvature.

5. The camera module of claim 3, wherein the target diopter is greater than the inflection point.

6. The camera module of claim 1, wherein the signal processing compensation unit is configured to calculate at least one of a plurality of fourth-first driving functions including a driving signal for the temperature for each diopter based on the plurality of third-first driving functions.

7. The camera module of claim 3, wherein, when the target diopter is less than the inflection point, the signal processing compensation unit is configured to calculate the feedback information corresponding to the temperature information and the target diopter based on at least one of the first-second driving function and the second-second driving function.

8. The camera module of claim 5,
wherein in each of the first-second driving function and the second-second driving function, a variation of the driving signal according to the temperature is inversely proportional to the curvature.

9. The camera module of claim 5, wherein the signal processing compensation unit is configured to calculate at least one of the first-first driving function and the second-first driving function as the feedback information.

10. The camera module of claim 6, wherein the signal processing compensation unit is configured to calculate the feedback information based on the at least one of the plurality of fourth-first driving functions.

11. The camera module of claim 7, wherein the signal processing compensation unit is configured to calculate a plurality of third-second driving functions for each temperature from the first-second driving function and the second-second driving function.

12. The camera module of claim 11, wherein the signal processing compensation unit is configured to calculate the feedback information based on at least one of the first-second driving function, the second-second driving function, and the plurality of third-second driving functions.

13. The camera module of claim 12, wherein the signal processing compensation unit is configured to calculate at least one of a plurality of fourth-second driving functions including a driving signal for the temperature for each diopter based on the plurality of third-second driving functions.

14. The camera module of claim 13,
wherein slopes of the plurality of fourth-second driving functions decrease as first and second diopters increase.

15. A mobile device comprising,
a camera module; and
a control unit,
wherein the camera module includes,
a lens assembly including a liquid lens having a first liquid and a second liquid that form an interface;
a temperature sensor configured to detect temperature information of the liquid lens;
a controller configured to adjust the interface by applying a driving signal to the liquid lens; and
a signal processing compensation unit configured to output feedback information, in which an inclination of a first diopter of the liquid lens according to the driving signal is proportional to a temperature in a first region and an inclination of a second diopter of the liquid lens according to the driving signal is inversely proportional to a temperature in a second region that is different from the first region, to the controller,
a detection unit including a detection element configured to detect capacitance of a boundary region in contact with the first liquid and configured to detect interface information corresponding to the interface of the liquid lens; and
a memory configured to store a plurality of first driving signals for each temperature for the first diopter of the liquid lens in the first region, a plurality of second driving signals for each temperature for the second diopter of the liquid lens in the first region, a plurality of third driving signals for each temperature for the first diopter of the liquid lens in the second region, and a plurality of fourth driving signals for each temperature for the second diopter of the liquid lens in the second region,
wherein the signal processing compensation unit is configured to calculate a first-first driving function for the plurality of first driving signals, a second-first driving function for the plurality of second driving signals, a first-second driving function for the plurality of third driving signals, and a second-second driving function for the plurality of fourth driving signals,
wherein the first diopter and the second diopter are different from each other,
wherein the signal processing compensation unit is configured to calculate a plurality of third-first driving functions for each temperature from the first-first driving function and the second-first driving function and calculate the feedback information based on at least one of the first-first driving function, the second-first driving function, and the plurality of third-first driving functions, and wherein the plurality of third-first driving functions are linear functions of the driving signal for the first or second diopter at a specific temperature.

* * * * *